US012643278B2

(12) United States Patent
Heinrich et al.

(10) Patent No.: US 12,643,278 B2
(45) Date of Patent: Jun. 2, 2026

(54) METHOD FOR PRODUCING A MULTILAYER BODY AND A MULTILAYER BODY

(71) Applicants: LEONHARD KURZ Stiftung & Co. KG, Fürth (DE); BURG DESIGN GMBH, Steyr (AT); PolyIC GmbH & Co. KG, Fürth (DE)

(72) Inventors: Matthias Heinrich, Nuremberg (DE); Christoph Fenzl, Rednitzhembach (DE); Andreas Ullmann, Zirndorf (DE); Stefanie Heidl, Enns (AT); Karin Salzmann, Oed (AT)

(73) Assignees: LEONHARD KURZ Stifting & Co. KG, Fürth (DE); BURG DESIGN GMBH, Steyr (AT); PolyIC GmbH & Co. KG, Fürth (DE)

( * ) Notice: Subject to any disclaimer, the term of this patent is extended or adjusted under 35 U.S.C. 154(b) by 186 days.

(21) Appl. No.: 18/783,660

(22) Filed: Jul. 25, 2024

(65) Prior Publication Data

US 2024/0375341 A1     Nov. 14, 2024

Related U.S. Application Data

(62) Division of application No. 17/283,080, filed as application No. PCT/EP2019/076456 on Sep. 30, 2019, now Pat. No. 12,076,908.

(30) Foreign Application Priority Data

Oct. 9, 2018     (DE) ......................... 102018124853.9

(51) Int. Cl.
    *B29C 51/14*       (2006.01)
    *B29C 51/16*       (2006.01)
                     (Continued)

(52) U.S. Cl.
    CPC .............. *B29C 51/14* (2013.01); *B29C 51/16* (2013.01); *B29L 2031/3406* (2013.01);
                     (Continued)

(58) Field of Classification Search
    CPC ......... B29C 51/12; B29C 51/14; B29C 51/16; B29L 2031/34; B29L 2031/3406;
                     (Continued)

(56) References Cited

U.S. PATENT DOCUMENTS 6,824,321  B2    11/2004   Ward et al.
9,599,451  B2     3/2017   Ullmann et al.
                     (Continued)

FOREIGN PATENT DOCUMENTS

CN        102470581  A      5/2012
CN        105980127  A      9/2016
                     (Continued)

OTHER PUBLICATIONS

Korean Office Action dated Feb. 10, 2025.

*Primary Examiner* — John D Freeman
(74) *Attorney, Agent, or Firm* — Hoffmann & Baron, LLP

(57)                ABSTRACT
A method for producing a multilayer body and a multilayer body, wherein the method includes: providing a single-layered or multi-layered substrate with a first surface and a second surface, providing one or more sensor films which each have at least one sensor area and have a first surface and a second surface facing away from the first surface, applying the one or more sensor films to the second surface of the substrate such that the first surface of the respective sensor film rests on the second surface of the substrate at least in areas, thermoforming a series of layers comprising the substrate and the one or more sensor films applied to the second surface of the substrate such that, during the thermoforming, on the first surface of the substrate a surface relief is formed which is determined by the shaping, of one or more of the one or more sensor films.

4 Claims, 20 Drawing Sheets

(51) Int. Cl.

| | | |
|---|---|---|
| *B29L 31/00* | (2006.01) |
| *B29L 31/34* | (2006.01) |
| *B31D 1/02* | (2006.01) |
| *G09F 3/04* | (2006.01) |

(52) U.S. Cl.

CPC .................. *B29L 2031/3425* (2013.01); *B29L 2031/3443* (2013.01); *B29L 2031/3481* (2013.01); *B29L 2031/744* (2013.01); *B31D 1/021* (2013.01); *G09F 3/04* (2013.01)

(58) Field of Classification Search

CPC ..... B29L 2031/3425; B29L 2031/3443; B29L 2031/3481; B29L 2031/744; B31D 1/021; G06F 2203/04103; G09F 3/04

See application file for complete search history.

(56) References Cited

U.S. PATENT DOCUMENTS

| | | | |
|---|---|---|---|
| 2003/0121767 | A1 | 7/2003 | Caldwell |
| 2003/0127525 | A1 | 7/2003 | Stromberg |
| 2008/0095988 | A1 | 4/2008 | Frey et al. |
| 2010/0151207 | A1 | 6/2010 | Hansen et al. |
| 2011/0316785 | A1* | 12/2011 | Hidary .................. G06F 3/0393 |
| | | | 345/168 |
| 2012/0032916 | A1 | 2/2012 | Enoki |
| 2012/0156445 | A1 | 6/2012 | Schmidt et al. |
| 2016/0192474 | A1 | 6/2016 | Niskala et al. |
| 2016/0318222 | A1 | 11/2016 | Deckert et al. |
| 2018/0021995 | A1* | 1/2018 | Schulz ............. B29C 45/14065 |
| | | | 428/209 |
| 2018/0143689 | A1 | 5/2018 | Heubel et al. |
| 2022/0001619 | A1 | 1/2022 | Achten et al. |

FOREIGN PATENT DOCUMENTS

| | | |
|---|---|---|
| DE | 20308525 U1 | 8/2003 |
| DE | 20307486 U1 | 10/2003 |
| DE | 102011111506 20 | 2/2013 |
| JP | 2008-520099 A | 6/2008 |
| JP | 2010-253857 A | 11/2010 |
| JP | 2011121183 A | 6/2011 |
| JP | 6140769 B2 | 5/2017 |
| WO | 2006/055164 A2 | 5/2006 |
| WO | 2006/108611 A2 | 10/2006 |
| WO | 2007/041708 A1 | 4/2007 |
| WO | 2017056005 A1 | 4/2017 |

* cited by examiner

METHOD FOR PRODUCING A MULTILAYER BODY AND A MULTILAYER BODY

This application is a divisional of U.S. application Ser. No. 17/283,080, filed Apr. 6, 2021, which is a National Stage application based on an International Application filed under the Patent Cooperation Treaty, PCT/EP2019/076456, filed Sep. 30, 2019, which claims priority to DE 102018124853.9, filed Oct. 9, 2018.

BACKGROUND OF THE INVENTION

The invention relates to a method for producing a multi-layer body and a multilayer body.

It is known to provide sensors, in particular touch sensors, in plastic films. A sensor film of this type is described, for example, in DE 10 2011 111 506 A1. This sensor film has a carrier film, to which transparent strip conductors are applied. Through corresponding arrangement or superimposition of these strip conductors, capacitive touch sensors are formed in the sensor film.

When sensors of this type are used, it may be necessary or desirable to combine the electrical functionality with further optical or decorative elements.

SUMMARY OF THE INVENTION

The object of the present invention is to provide an improved method for producing a multilayer body and an improved multilayer body which provides a sensor functionality.

The object is achieved by a method for producing a multilayer body, wherein the method comprises the following steps:

- providing a single-layered or multi-layered substrate with a first surface and a second surface,
- providing one or more sensor films which each comprise at least one sensor area and have a first surface and a second surface facing away from the first surface, applying the one or more sensor films to the second surface of the substrate such that the first surface of the respective sensor film rests on the second surface of the substrate at least in areas,
- thermoforming a series of layers comprising the substrate and the one or more sensor films applied to the second surface of the substrate such that, during the thermo-forming, on the first surface of the substrate a surface relief is formed which is determined by the shaping, in particular contour and/or relief, of one or more sensor films of the one or more sensor films.

The object is further achieved by a multilayer body comprising a single-layered or multi-layered substrate with a first surface and a second surface and one or more sensor films which each comprise at least one sensor area and have a first surface and a second surface facing away from the first surface, wherein the one or more sensor films are arranged on the second surface of the substrate, wherein the first surface of the respective sensor film rests on the second surface of the substrate at least in areas, and wherein on the first surface of the substrate a surface relief is formed which is determined by the shaping, in particular contour and/or relief, of one or more of the one or more sensor films.

Such a method for producing a multilayer body and such a multilayer body are characterized in that a surface relief is generated on the first surface of the substrate facing away from the sensor film through the choice of the process parameters and the materials of the constituents of the multilayer body, such as for example the constituents of the sensor films and/or the substrate, used. The sensor film and the sensor area of the sensor film are for one thing thus protected from environmental influences by the substrate. As the substrate is manufactured separately before being combined with the sensor film, correspondingly dimensionally stable and chemical-resistant materials can be used for the substrate, which are not compatible with the methods used during production of the sensor film for producing the delicate strip conductors for providing the sensor functionality. Further, during the production of the substrate further decorative designs can also be introduced into the substrate and/or applied to the substrate, which likewise need not be compatible with the "sensitive" process conditions during the production of the sensor films. Further, it is brought about by the method according to the invention that a surface relief aligned registration-accurate relative to the sensor film and thus the sensor functionality is molded in the surface of the substrate, facing away from the sensor film, which when used as a user interface provides a corresponding protection or where appropriate a corresponding decorative design for the sensor functionality. The corresponding surface design can be "controlled" through the sensor film. It is not necessary here to use corresponding additional registering methods or the like or to create separate stamping dies for the molding of the surface relief. Instead a register-accurate arrangement of the surface relief relative to the sensor functionality can be created in a simple manner without additional process-related effort.

Advantageous embodiments of the invention are described in the dependent claims.

In particular, it is possible for at least one sensor film of the one or more sensor films preferably to be formed and/or provided as a transfer film, as a laminating film, as an in-mold film, as a label, as an in-mold label and/or as a sensor label.

When at least one sensor film of the one or more sensor films is provided, the shaping, in particular the contour and/or the relief, of the at least one sensor film is preferably modified. Further, the shaping, in particular the contour and/or the relief, of the at least one sensor film is modified by molding of at least one surface relief, wherein the at least one surface relief is molded into one or more layers of the sensor film in particular by means of methods selected from thermal replication, UV replication, laser ablation, stamping, punching, cutting, injection molding.

Further preferably, the shaping, in particular the relief and/or the contour, of the at least one sensor film is modified by applying one or more elements to a base film of the sensor film, which elements are preferably applied by means of one or more of the following methods: printing, in particular printing on a varnish, and/or by means of 3D printing, casting, laminating or gluing on a one or multi-layered film element, in particular a plastic label, applying a woven fabric, in particular a glass fiber fabric, applying a fiber material, in particular an organic fiber material, back injection molding, applying the one or more elements by means of a transfer method, in particular a hot- or cold-stamping method.

It is further possible for one or more plastic label and/or one or more functional elements to be applied as one or more elements in particular to a first surface of a base film of the sensor film, wherein the first surface of the base film is preferably facing the first surface of the sensor film and/or the first surface of the base film preferably partially forms the first surface of the sensor film.

Thus it is also possible for one or more plastic labels and/or one or more functional elements in particular to be applied to one or more of the one or more plastic label and/or functional elements applied to the first surface of the base film of the sensor film. Further preferably, the one or more plastic label and/or functional elements are applied to the base film in the sensor area of the sensor film and completely or partially overlapping the sensor area, in particular projected onto the plane spanned by the first surface of the at least one sensor film.

It is also possible for the sensor film to have in particular at least one connection area and/or at least one contact area for the contacting, in particular for the electrical contacting, of one or more sensor elements arranged in the sensor area, and for the one or more plastic label and/or functional elements preferably to be applied to the base film in the sensor area of the sensor film and preferably to completely or partially overlap the sensor area, in particular projected onto the plane spanned by the first surface of the at least one sensor film, but preferably not to overlap the connection area and/or the contact area of the sensor film.

It is further possible for the at least one connection area to have one or more contact areas, in particular for the electrical contacting.

One or more sensor films of the one or more sensor films preferably consist only of one or more sensors. For the formation of the surface relief in the first surface of the substrate it has however been shown to be advantageous for in particular one or more sensor films of the one or more sensor films to be composed of several layers. Layers of this type preferably comprising one or more plastic label and/or one or more functional elements in any desired sequence starting from the first surfaces of the respective sensor films, wherein one or more functional elements of the one or more functional elements are formed as 3D elements or as functional elements extended in all spatial directions.

It is further possible for in particular one or more sensor films of the one or more sensor films to comprise one or more further, preferably printed, haptic elements. Haptic elements have in particular tactilely detectable structures or other properties. Here, one or more haptic elements of the one or more haptic elements are formed as functional elements extended in all spatial directions and/or are haptically detectable, in particular by human fingertips and/or thumb tips.

It is possible to accommodate the at least one connection area and/or contact area of the sensor film by means of tool adaptations. In particular, the at least one connection area and/or contact area is at least partially not back-injection molded and protrudes, in particular like a flag, from the rest of the multilayer body and/or the single-layered or multi-layered substrate, wherein the connection area and/or contact area protrudes in particular in such a way that it can be guided to a countercontact, to which the at least one connection area and/or contact area can be connected. Preferably, a non-back-injection molded connection area and/or contact area in the form of a flag is not provided at the edge of the multilayer body and/or on the single-layered or multi-layered substrate. The connection area and/or contact area, in particular the flag-like connection area and/or contact area, preferably protrudes from one or more surfaces and/or surface areas of the multilayer body and/or the single-layered or multi-layered substrate. Further preferably, at one or more edge areas, the multilayer body and/or the single-layered or multi-layered substrate is attached to or inserted in further elements of an electrical device, wherein in particular the possibility of contacting at the at least one connection area and/or contact area, in particular the at least one electrical connection area and/or contact area, preferably continues to exist.

It is further possible for contact pins to be used as contacting method, with the result that at least one sensor without a connection area and/or contact area is subsequently contacted by means of contact pins.

It is furthermore possible to design the length of the contact area in such a way that the contact area protrudes laterally, and in particular naturally leaves an imprint, wherein an imprint of this type is preferably taken into consideration in the design.

During the lamination, it is possible to vary the laminating temperature and/or the laminating pressure during the period of the lamination. For example, the lamination can start with a low laminating temperature which is then increased steadily or unevenly and/or for example the lamination can start with a low laminating pressure which is then increased steadily or unevenly. Other variations of laminating pressure and/or laminating temperature over the laminating time are also possible.

One or more of the functional elements are preferably formed by one element which performs an electrical and/or optical function, is in particular constituted by a light guide. A light guide of this type consists in particular of a plastic, preferably one or more PMMA (PMMA=polymethyl methacrylate) and/or one or more PC (PC=polycarbonate), and/or glass. It is further possible for such a light guide or a plurality of such light guides to be arranged and/or applied and/or formed in and/or between and/or on/to one or more sensor films of the one or more sensor films.

It has proved to be advantageous to form one or more functional elements of the one or more functional elements as light guides. In particular, a targeted light guiding in the multilayer body in combination with the formation of the surface relief in the first surface of the substrate is hereby possible.

It is further possible also to use as functional elements woven fabric made of natural, plant and/or synthetic tissues, preferably glass fiber fabric and non-crimp fabric, further preferably plant-based relief-forming sheets, such as for example wood veneers, wherein the fabric reliefs corresponding to the fabrics or the fabric contours are hereby, in particular additionally, formed in the first surface of the substrate as part of the surface relief or as a surface relief.

It is possible for the one or more sensor films to be applied to the second surface of the substrate preferably by means of lamination, wherein the laminating temperature preferably lies between 80° C. and 300° C., in particular between 100° C. and 300° C., preferably between 120° C. and 240° C., wherein in particular the laminating speed lies between 0.125 m/min and 10 m/min, preferably between 0.25 m/min and 7.5 m/min, particularly preferably between 0.125 m/min and 5 m/min.

By "laminating temperature" is meant in particular the surface temperature or the temperature at a point or in an area inside one or more sensor films of the one or more sensor films and/or the substrate during the lamination.

It is possible for the at least one sensor film of the one or more sensor films, in particular the at least one sensor film of the one or more sensor films comprising at least one decorative layer of the one or more decorative layers, to be applied to the second surface of the substrate, in particular to the second surface of the substrate comprising at least one decorative layer of the one or more decorative layers, preferably by means of a stamping method, roll-on method and/or back injection molding method.

In particular, one or more decorative layers of the one or more decorative layers have a layer thickness between 0.01 mm and 10 mm, in particular between 0.1 mm and 2.5 mm, preferably between 0.25 mm and 1.25 mm, and/or between 0.1 mm and 10 mm, in particular between 0.25 mm and 2.5 mm, preferably between 0.25 mm and 1.25 mm.

It has proved to be advantageous to deposit or apply the one or more sensor films preferably on or to the second surface of the substrate, in particular a substrate comprising one or more decorative films, preferably by means of stamping methods, roll-on methods and/or back injection molding methods.

Further, it is also possible for the surface relief to be formed in particular by means of deep-drawing and heating of the substrate during the thermoforming of the series of layers, wherein the substrate is preferably heated to a surface temperature between 80° C. and 300° C., in particular between 90° C. and 250° C., preferably between 100° C. and 300° C., wherein in particular the core temperature of the substrate lies between 120° C. and 160° C., preferably between 100° C. and 180° C., particularly preferably between 80° C. and 200° C., and/or wherein a pressure, in particular a positive pressure between 1 bar and 6 bar, in particular between 2 bar and 5 bar, preferably between 2 bar and 3.5 bar, is applied. This pressure acts on the substrate in particular from one of the two sides. A vacuum, thus a negative pressure, which is preferably between 0.1 bar and 0.9 bar, in particular between 0.2 bar and 0.8 bar, is preferably additionally applied supportively from the corresponding other side of the substrate. For example, a positive pressure can act from the front side of the substrate and a negative pressure can act from the rear side of the substrate, or vice versa; this preferably means that a negative pressure is applied from the front side of the substrate and a positive pressure is applied from the rear side of the substrate.

By "laminating temperature" is meant in particular the temperature at a point or in an area inside the series of layers, in particular at the geometric center of the series of layers, during the deep-drawing or heating of the series of layers.

It is hereby possible in particular for the surface relief preferably to be formed in the first surface of the substrate, wherein the surface relief is preferably formed by the shaping, in particular by the contour and/or the relief, of the one or more sensor films.

Further, it is hereby preferably achieved that the hitherto additional marking of the sensor area, for example by subsequently applied pictograms, is replaced by optical and/or haptic surface reliefs, which are or have been formed on the first surface of the substrate. Such a novel marking in particular does not require an additional method step as they can be molded during the thermoforming through the one or more sensor films and/or further films, layers, labels, in particular plastic labels, and/or elements, in particular functional elements, preferably 3D elements, and thus can be integrated into the surface design of the resulting multilayer body.

Further, new design freedoms preferably result here such that the one or more sensor films and/or further films, layers, labels, in particular plastic labels, and/or elements, in particular functional elements, preferably 3D elements, can be integrated into the multilayer body in harmony with the design.

Further, it is hereby preferably achieved, in contrast to the hitherto additional markings of the sensor area, for example by subsequently applied pictograms which are "worn off" or worn down over time, that the marking according to the invention is more resistant to long-term stresses or long-term use of this type.

Furthermore, it is hereby in particular achieved that the position and geometric extent of the "active" sensor area, in particular in the plane spanned by the multilayer body and/or in particular perpendicular to this plane, becomes or is haptically and/or optically detectable. The undesirable tracing effect of the one or more sensor films and/or or further films, layers, labels, in particular plastic labels, and/or elements, in particular functional elements, preferably 3D elements, is preferably used here in order to avoid having to apply additional "virtual", subsequently applied operating elements such as buttons or switches as decoration, such as for example as subsequently applied pictograms.

To date, sensors have been bonded in particular behind deep-drawn parts, with the result that the consumer and/or user has to be specifically advised of the sensory functionality as this functionality would otherwise remain undetected. The user and/or consumer is normally made aware of the sensory functionality by means of separate, subsequently applied pictograms, which are preferably located in the corresponding positions on the side of the component facing the user. In particular, this generally requires an additional method step for the application or generation of pictograms of this type.

The series of layers, in particular a series of layers comprising one or more decorative films, is preferably formed from one or more PC and/or one or more PMMA.

It is further possible for the series of layers, in particular the series of layers comprising the one or more decorative films, preferably not to be formed from glass fiber-filled or synthetic fiber-filled PC and/or PMMA.

It is further possible for the substrate, in particular the substrate comprising the one or more decorative films, in particular not to be formed from blends or mixtures of ABS and/or PC and/or pure ABS and/or pure polyamide and/or blends or mixtures thereof.

During the thermoforming of the series of layers, the surface relief is preferably formed by means of lamination of the series of layers, wherein the laminating temperature preferably lies between 80° C. and 300° C., in particular between 100° C. and 260° C., preferably between 120° C. and 240° C., wherein in particular the laminating speed lies between 0.125 m/min and 10 m/min, preferably between 0.25 m/min and 10 m/min, particularly preferably between 0.5 m/min and 10 m/min, and/or preferably between 0.25 m/min and 7.5 m/min.

It has proved to be advantageous that a substrate which, preferably before the thermoforming, has a layer thickness, in particular an average layer thickness, between 125 μm and 3500 μm, in particular between 400 μm and 1500 μm, preferably between 600 μm and 1100 μm, is preferably provided as substrate, and/or that a substrate which, preferably after the thermoforming, has a layer thickness, in particular an average layer thickness, between 125 μm and 3500 μm, in particular between 400 μm and 1500 μm, preferably between 600 μm and 1100 μm, is preferably provided as substrate.

The substrate, in particular the substrate having the one or more decorative layers, preferably consists of a material, preferably a solid material, without air pockets.

It has proved to be advantageous if the substrate, in particular the substrate having the one or more decorative layers, is not made of foam and/or a foam-like material or substance because, for example, the mechanical behavior of a foam and/or of a foam-like material is unknown or can be determined only with a great effort and the pockets, in particular air pockets, enclosed or contained in the foam or the foam-like material negatively affect the electrical properties, in particular the electrical conductivity the capacitance, of the one or more sensor films.

It is further possible for a substrate having a first melting temperature preferably to be provided as substrate and for a sensor film having a second melting temperature preferably to be provided as sensor film, wherein in particular the first melting temperature is lower, is preferably 1 to 3 times lower, is further preferably 1.3 to 2.5 times lower, than the second melting temperature, wherein the substrate preferably consists of a biaxially oriented PET or polyethylene terephthalate. By "melting temperature" or melting point is meant here in particular the temperature at which a material and/or substance melts and as a consequence of which preferably changes from a solid state into a liquid state.

It is also possible for a substrate having a first softening temperature preferably to be provided as substrate and for a sensor film having a second softening temperature preferably to be provided as sensor film, wherein in particular the first softening temperature is lower, is preferably 1 to 3 times lower, is further preferably 1.3 to 2.8 times lower, than the second softening temperature.

By "softening temperature" or softening point is meant here in particular the temperature at which a material and/or a substance, preferably under predetermined conditions, begins to flow. Here, the material and/or the substance is in particular heated until it changes from the solid state into the liquid state. By softening temperature is meant here in particular the Vicat softening temperature (VST), preferably measured with test load B, 50 N, thus preferably VSTB.

It has proved to be advantageous that the variable method parameters, such as for example temperature and/or pressure, in particular mechanical pressure, of the thermoforming process are preferably predetermined such that the softening or plasticization of the substrate, in particular of the substrate comprising one or more decorative films, occurs at lower temperatures, in particular softening temperatures and/or melting temperatures, and/or pressures, in particular mechanical pressures, than the softening or plasticization of the one or more sensor films.

Tests have shown that the melting temperature of the substrate, in particular of the substrate comprising the one or more decorative films, is preferably lower than the melting temperature of the one or more sensor films here. Thus, for example, the melting temperature of a substrate, in particular of a substrate comprising one or more decorative films, consisting of PC lies between 220° C. and 230° C. and/or, for example, the melting temperature of one or more sensor films consisting of PET is 255° C., in particular lies between 250° C. and 260° C.

Tests have further shown that the change in the height of the provided substrate with sensor laminated on, preferably of a substrate with sensor with a predetermined layer thickness laminated on, due to the thermoforming has in particular a functional relationship with the layer thickness of the applied sensor film, wherein this functional relationship is in particular a quadratic polynomial of the form $y=a \cdot x^2+b \cdot x+c$, preferably with the parameters a=0.0035; b=0.4832, c=38.19; and preferably the variables x=layer thickness of the applied sensor label, y=height of the shaping at the location of the sensor label compared with the remaining substrate surface area without sensor label after the thermoforming.

It has been shown here that the one or more sensor films act in particular as heat insulator during the thermoforming, preferably during the deep-drawing. When the series of layers is thermoformed, the series of layers is preferably heated from the direction of the second surfaces of the one or more sensor films or of the second surface of the substrate, with the result that the heat flow into the substrate, in particular the substrate comprising the one or more decorative films, in the one or more areas in which the one or more sensor films rest on the first surface of the one or more sensor films is preferably less than in the areas in which the one or more sensor films do not rest on the first surface of the one or more sensor films.

Before the thermoforming, the series of layers preferably has a curvature with a minimum or maximum radius of curvature and/or with an average radius of curvature of no smaller than 1.5 mm, preferably of no smaller than 1 mm.

By "curvature" is meant in particular a local deviation of a curve from a straight line. By the curvature of a curve is meant in particular one change in direction per length and/or stretch passed through of a sufficiently short curve piece or curve progression. The curvature of a straight line is equal to zero everywhere. A circle with a radius r has the same curvature everywhere, namely 1/r. In the case of most curves, the curvature changes from curve point to curve point, in particular the curvature changes continuously from curve point to curve point, with the result that the curves in particular have no kinks and/or points of discontinuity. The curvature of a curve at a point P thus indicates how much the curve deviates from a straight line in the immediate surroundings of the point P. The amount of the curvature is called the radius of curvature and this corresponds to the inverse value of the amount of a local radius vector. The radius of curvature is the radius of the circle which represents the best approximation in the local surroundings of the contact and/or tangential point P of a curve.

During the thermoforming, the series of layers is preferably modified in such a way that the series of layers, after the thermoforming, preferably has a curvature with a minimum or maximum radius of curvature and/or with an average radius of curvature of no smaller than 1.5 mm, preferably of no smaller than 1 mm.

Nevertheless, it is preferably possible to integrate optical markings for the user in the form of pictograms introduced into or applied to decorative layers into the multilayer body in such a way that these pictograms are arranged in the sensor area or overlap the sensor area and/or are arranged outside the sensor area.

It is further possible for a substrate preferably to be provided as substrate and/or for at least one sensor film preferably to be provided as at least one sensor film, which comprise one or more decorative layers, wherein in particular the decorative layers have one or more pictograms in one or more areas, preferably in the sensor area. Preferably, one or more pictograms of the one or more pictograms overlap or supplement each other to form an overall pictogram.

In particular, one or more of the pictograms of the one or more pictograms or the overall pictogram are in each case formed as a motif, a graphically designed outline, a figurative representation, an image, a visually recognizable image, a symbol, a logo, a portrait, a pattern, an alphanumeric character, a text and/or the like.

It is also possible for surface relief formed in the first surface of the substrate to be formed in such a way that it constitutes one or more pictograms which are optically and/or haptically detectable, in particular by means of a human fingertip or thumb tip.

It is possible for the substrate to have in particular one or more transparent areas, wherein in particular the transmittance of the substrate between the first surface of the substrate and the second surface of the substrate in the one or more transparent areas in a wavelength range visible to the human eye is greater than 1%, preferably greater than 2%, further preferably greater than 4%, and/or less than 99%, preferably less than 95%, further preferably less than 92%.

It is further possible for one or more decorative films of the one or more decorative films to have in particular pigmented and/or dyed and/or metallized and/or partially metallized layers. Partially transparent or transparent decorative films are preferably combined with transparent sensor films in order to provide a transmittance or light transmission and/or a controlled and/or predetermined emissivity at least in areas in particular when the multilayer body is viewed from the first surface.

The transparent areas are preferably clearly transparent, i.e. in particular not dyed and/or have the color of the substrate, or dyed, matted with fillers, and/or colored, or are in particular a combination, in particular a combination in areas of different transparencies and/or colorings in areas, of the above properties. Clearly transparent areas of this type comprise in particular one or more areas of the sensor area or the entire sensor area.

It is possible for the multilayer body to have transparent areas which extend across all layers, with the result that a light source, for example, can be detected through the multilayer body in transmitted light by an observer.

In particular, the gloss levels of the one or more decorative layers or of the substrate or of the one or more sensor films lie between 2 @60°, in particular 2 GU at a measuring angle of 60°, and 160 @60°, in particular 160 GU at a measuring angle of 60°, wherein by "GU" is meant in particular "gloss units".

It is further possible to arrange one or more or all decorative films, pictograms, plastic labels, functional elements, transparent areas and/or sensor films registered relative to each other or to one or more or all decorative films, pictograms, plastic labels, functional elements, transparent areas and/or sensor films, in particular to form a registered overall design.

By register or registration, or register accuracy or registration accuracy, is meant a positional accuracy of two or more elements and/or layers relative to each other. The register accuracy is to range within a predetermined tolerance, which is to be as low as possible. At the same time, the register accuracy of several elements, partial areas, in particular one or more first partial areas, films and/or layers relative to each other is an important feature in order to increase the process reliability. The positionally accurate positioning is effected in particular by means of markings, in particular by means of sensorially, preferably optically detectable registration marks or register marks. These markings, in particular registration marks or register marks, preferably either represent specific separate elements or areas or layers or are preferably themselves part of the elements or areas or layers to be positioned.

The one or more sensor films are preferably aligned with the alignment and/or positioning of the one or more decorative layers by means of one or more templates. The sensor films are aligned in particular with register marks present in the decorative layers and preferably thus positioned in dependence on the design. In particular, an alignment of the sensor films with pictograms of the decorative layers, which are preferably printed on separately and/or on the rear side and/or from sides of the second surface of the substrate and/or are already present in the decorative layers, such as for example closed geometric pictograms, in particular circles and/or polygons, is further possible.

It is possible for a substrate preferably to be provided as substrate, which comprises one or more layers selected from: layers comprising pigments, color layers, metal layers, metallized layers, in particular partially metallized layers, transparent layers, translucent layers, opaque layers.

It is further possible for the one or more sensor films preferably to have, in each case in the at least one sensor area, one or more sensor elements, in particular capacitive and/or resistive sensor elements, and for the one or more sensor films in each case preferably to have at least one connection area and/or contact area for the contacting of one or more of the sensor elements.

It is also possible for a sensor film preferably to be provided as sensor film, which has in particular a base film and one or more electrically conductive layers, in particular consisting of a metallic material, applied to and/or introduced into the base film.

The one or more electrically conductive layers in the sensor area preferably form one or more sensor electrodes for the formation of one or more of the sensor elements, in particular for the formation of one or more capacitive sensor elements and/or one or more resistive sensor elements and/or that the one or more electrically conductive layers preferably have one or more contact electrodes for the contacting, in particular for the electrical contacting, of the one or more sensor electrodes in the connection area and/or contact area.

In particular, the one or more sensor electrodes, in particular one or more active sensor areas of the one or more sensor electrodes, will have a transparency to the human eye with a transmittance of more than 60%, in particular of more than 80%, and/or are in each case constituted by a network of thin strip conductors with a strip conductor width between 3 µm and 60 µm, in particular between 4 µm and 60 µm, in particular preferably between 4 µm and 50 µm.

In particular, a sensor film which preferably has a layer thickness between 10 µm and 300 µm, in particular between 50 µm and 200 µm, preferably between 60 µm and 150 µm, is provided as sensor film.

It has proved to be advantageous that the series of layers preferably has, at least in the sensor area, a capacitance of at most 200 pF, preferably at most 150 pF, further preferably at most 100 pF. This makes in particular a touch function possible in the sensor area, preferably by means of a human fingertip and/or a human thumb tip.

In particular, it is also possible for sensor cells without a tail supply line, preferably small sensor cells without a tail supply line, further preferably directly contactable sensor cells, to have a capacitance of at most 7 pF, in particular at most 5 pF, in particular preferably at most 3 pF, and/or for sensors with a tail, in particular large sensors with a tail, to have a capacitance of from 12 pF to 70 pF, preferably if these are injected, wherein the capacitances preferably turn out to be even higher if the decorative layers are slightly conductive.

It is possible for the single-layered or multi-layered substrate optionally to be printed on one side or on both sides. In order to facilitate the touch function or the sensor function of the applied sensor film or sensor films, it is advantageous for the multilayer body in particular to have a capacitance of at most 200 pF, wherein the self-capacitance of a measuring device, in particular a measuring head, is preferably taken into consideration in the measured value. The measuring device can be, for example, a so-called "self-capacitance" measuring head, which measures the self-capacitance of a structure connected to the measuring head.

It is further advantageous if the corrected values around the measuring device preferably have a maximum capacitance amounting to 150 pF, in order in particular to make a sufficient sensor sensitivity and/or sensor functionality possible through the layers of the multilayer body.

In the measurement method, a capacitive testing or measurement of an "ohmically" connected film test piece is preferably carried out. The film test piece, for example a touch sensor, has in particular connection areas and/or contact areas for the contacting, which are preferably connected to touch surface areas or sensor electrodes by means of thin strip conductors. The touch surface areas or sensor electrodes here constitute a first half and a second half of a coplanar capacitor.

Further, the measuring head preferably comprises contact pins for the ohmic contacting, an oscillator circuit chip, which has a particular frequency in particular depending on the connected capacitance, and evaluation electronics, which preferably determine the output frequency and in particular transmit it to a connected arithmetic unit. The frequency determined hereby is preferably accordingly a measure of the capacitance additionally connected to the measuring head. The additionally connected capacitance is in particular the capacitance of the connected coplanar capacitor or of the touch sensor.

The capacitance of the coplanar capacitor is preferably in turn dependent on the type of coplanar plates present, for example their surface area, shape and/or spacing, and in particular also on dielectric or conductive surroundings and/or layers, above and below the respective coplanar plates. If a conductive object, such as for example a human finger, now approaches the coplanar capacitor or the touch sensor, this preferably alters its measurable capacitance depending on the distance between the conductive object and the coplanar capacitor or touch sensor. The functioning, in particular the accuracy, of the coplanar capacitor or of the touch sensor is in particular checked hereby. An un-"touched" capacitance is preferably already sufficient as function criterion, if a particular minimum value is reached.

For the determination of the dielectric or conductive properties of a printed layer, a sensor of similar type, in particular based on the design, is preferably used. Here, comparative measurements are preferably first carried out on known materials, such as for example a 1 mm-thick PMMA plate as non-conductive material and for example a metallized film or carbon layer with known sheet resistances, in particular as fully conductive material. The measured values of high-resistance conductive printed layers preferably then lie between those of these two materials, which makes it possible in particular to infer their conductivity and thus their touch interfering capacity.

It is possible for the sensor area to comprise at least one edge area at least partially encircling the sensor area, in particular a ring-shaped edge area, in particular a circular ring-shaped edge area, in which the one or more sensor electrodes are not present, wherein the edge area preferably encircles the circumference of the sensor area from the outside or from the inside and/or follows the circumference of the sensor area and/or completely or partially overlaps the circumference of the sensor area.

The sensor area or the active touch area is preferably located only within the surface relief and in particular not on the surface relief itself.

It is further possible for the edge area preferably to have a width, in particular a radial width, between 0.25 mm and 5 mm, preferably between 0.5 mm and 5 mm, and/or for the ring-shaped edge area, in particular the circular ring-shaped edge area, preferably to have a ring width between 0.25 mm and 5 mm, preferably between 0.5 mm and 2 mm. The edge area preferably does not have any for the contacting of one or more sensor elements arranged in the sensor area.

It is also possible for the surface relief formed on the first surface of the substrate preferably to be haptically and/or optically detectable and/or for the surface relief formed on the first surface of the substrate preferably to be haptically but not optically detectable or preferably to be optically but not haptically detectable.

In particular, tests have shown that the surface relief formed on the first surface of the substrate a maximum height difference and/or an average height difference between a local minimum of the surface relief or an overall minimum of the surface relief and a local maximum of the surface relief or an overall maximum of the surface relief on, which is less than 5000 μm, in particular less than 2000 μm, preferably less than 1000 μm.

The surface relief formed on the first surface of the substrate preferably has a maximum height difference and/or an average height difference between a local minimum of the surface relief or an overall minimum of the surface relief and a local maximum of the surface relief or an overall maximum of the surface relief, which is greater than or equal to 50 μm, in particular greater than 25 μm, preferably greater than 10 μm.

It is possible for the surface relief formed on the first surface of the substrate preferably to be formed as Braille, in particular as one or more letters, one or more numbers, one or more words, and/or one or more sentences in Braille.

Preferred embodiments of the multilayer body are mentioned below.

The one or more sensor films in the sensor area preferably have, in particular in areas or over the whole surface, one or more films and/or one or more layers selected from: base film, plastic label, functional elements, in particular light guide, decorative layer, electrically conductive layer, in particular metallic layer, adhesive layer, adhesion-promoter layer, wherein the one or more electrically conductive layers in each case have one or more sensor electrodes and/or one or more contact electrodes.

It is possible for the one or more sensor films in the sensor area to have one or more sensor electrodes and/or one or more contact electrodes, wherein the sensor electrodes and/or the contact electrodes, in particular projected onto the plane spanned by the first surface of the at least one sensor film, are arranged next to each other and/or do not overlap each other and/or, in particular in the case of observation parallel to a surface normal defined by the plane of the multilayer body, one or more sensor electrodes of the one or more sensor electrodes overlap with one or more contact electrodes of the one or more contact electrodes.

It is further possible for the surface relief, in particular projected onto the plane spanned by the first surface of the at least one sensor film, to be at least partially composed of one or more straight, curved, circular arc-shaped and/or circular elevations and/or recesses, in particular in the sensor area.

It is also possible for the surface relief, in particular projected onto the plane spanned by the first surface of the at least one sensor film, to be at least partially formed with one or more linear, helical and/or elliptical elevations and/or recesses, in particular in the sensor area.

Further, it is also possible for the surface relief, in particular in the sensor area, to be formed in such a way that one or more elevations of the one or more elevations and/or one or more recesses of the one or more recesses, in particular in the sensor area, in each case have a constant or varying sidewall angle and/or a constant or varying width and/or a constant or varying height or depth and/or a constant or varying curvature.

In particular, the shape of one or more elevations of the one or more elevations and/or one or more recesses of the one or more recesses, in particular projected onto the plane spanned by first surface of the at least one sensor film, is, preferably in the sensor area, in each case selected or combined from: line, straight line, motif, image, triangle, wave, quadrilateral, polygon, curved line, circle, oval, trapezoid, parallelogram, rhombus, cross, sickle, branch structure, star, ellipse, fractal pattern, random pattern, pseudorandom pattern, wherein the one or more elevations and/or the one or more recesses in particular overlap and/or supplement each other.

One or more elevations of the one or more elevations and/or one or more recesses of the one or more recesses are preferably formed over the progression, in particular in the plane spanned by the first surface of the at least one sensor film, of the respective elevations and/or recesses in such a way that one or more of the heights of the elevations and/or one or more depths of the recesses, in particular perpendicular to the plane spanned by the second surface of the substrate, do not have a variation or have a variation at least in sections, wherein the variation is selected from: wavelike, symmetrical, asymmetrical, periodic, aperiodic, discrete, continuous, stepped.

BRIEF DESCRIPTION OF THE DRAWINGS

In the following the invention is explained with reference to several embodiment examples utilizing the attached drawings by way of example. There are shown in.

DETAILED DESCRIPTION

Figure 1:
FIG. 1 shows a schematic representation of a series of layers
Figure 1:
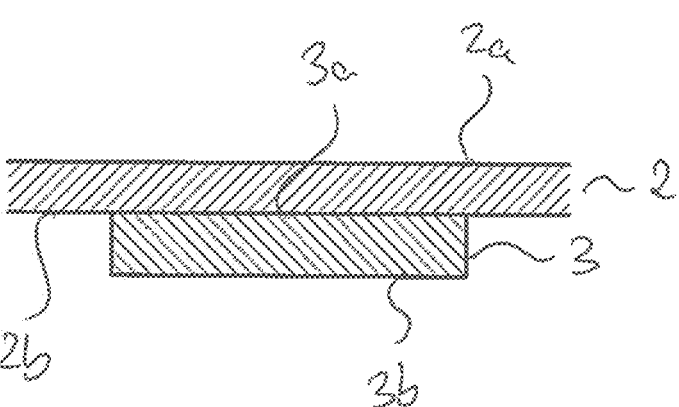

FIG. 1 shows a series of layers 4 comprising a substrate 2 and a sensor film 3 in cross section. The sensor film 3 rests on the substrate 2, wherein the first surface 3a of the sensor film 3 rests on the second surface of the substrate 2.

It is further possible for a substrate 2 having a first melting temperature in particular to be provided as substrate 2 and for a sensor film 3 having a second melting temperature to be provided as sensor film 3, wherein in particular the first melting temperature is lower, is preferably 1 to 3 times lower, is further preferably 1.3 to 2.5 times lower, than the second melting temperature.

In particular, a substrate 2 having a first softening temperature is provided as substrate 2 and a sensor film 3 having a second softening temperature is provided as sensor film 3, wherein in particular the first softening temperature is lower, is preferably 1 to 3 times lower, is further preferably 1.3 to 2.8 times lower, than the second softening temperature.

Figure 2:
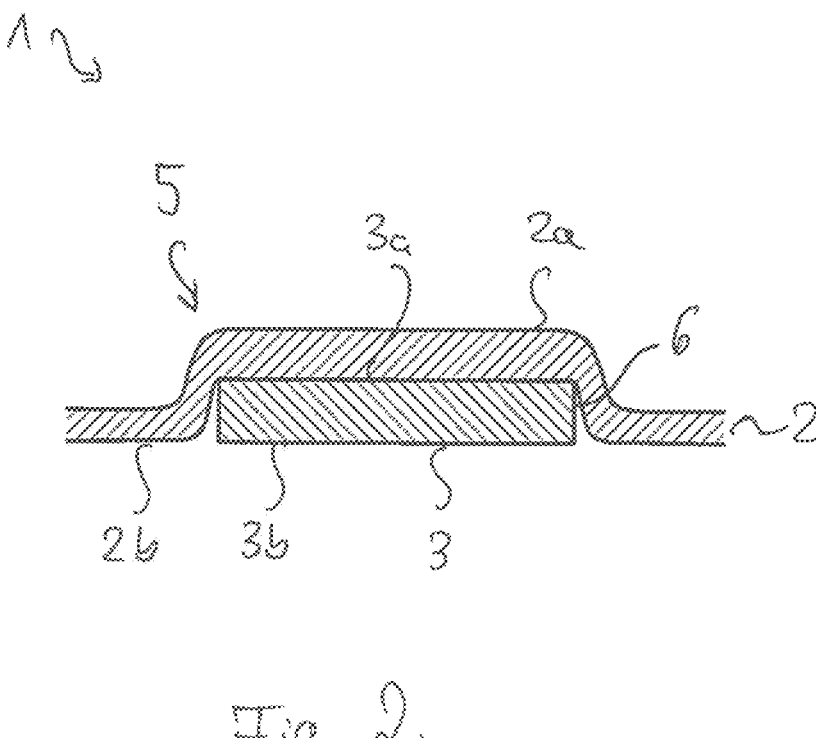
FIG. 2 shows a schematic representation of a multilayer body

FIG. 2 shows a multilayer body 1 comprising a substrate 2 and a sensor film 3 in cross section, wherein the first surface 2a of the substrate 2 forms a surface relief 5.

Here, the surface relief 5 is determined by the shaping 6 of the sensor film 3.

The multilayer body 1 is preferably produced by a method comprising the following steps:

providing a single-layered or multi-layered substrate 2 with a first surface 2a and a second surface 2b, providing one or more sensor films 3 which each comprise at least one sensor area 30 and have a first surface 3a and a second surface 3b facing away from the first surface 3a, applying the one or more sensor films 3 to the second surface 2b of the substrate 2 such that the first surface 3a of the respective sensor film rests on the second surface 2b of the substrate 2 at least in areas, thermoforming a series of layers 4 comprising the substrate 2 and the one or more sensor films 3 applied to the second surface 2b of the substrate 2 such that, during the thermoforming, on the first surface 2a of the substrate 2 a surface relief 5 is formed which is determined by the shaping 6, in particular contour and/or relief, of one or more of the one or more sensor films 3.

In particular, FIG. 1 shows here the series of layers 4 which results from applying the sensor film 3 to the second surface 2b of the substrate 2, wherein the first surface 3a of the sensor film 3 rests on the second surface 2b of the substrate 2.

A substrate 2 which, preferably before the thermoforming, has a layer thickness, in particular an average layer thickness, between 125 μm and 3500 μm, in particular between 400 μm and 1500 μm, preferably between 600 μm and 1100 μm, is preferably provided as substrate 2.

Further preferably, a substrate 2 which, preferably after the thermoforming, has a layer thickness, in particular an average layer thickness, between 125 μm and 3500 μm, in particular between 400 μm and 1500 μm, preferably between 600 μm and 1100 μm, is provided as substrate 2.

A sensor film 3 which has in particular a layer thickness between 10 μm and 300 μm, in particular between 50 μm and 200 μm, preferably between 60 μm and 150 μm, is preferably provided as sensor film 3.

It is possible for the sensor film 3 to be applied to the second surface 2*b* of the substrate 2 in particular by means of lamination, wherein the laminating temperature lies between 80° C. and 300° C., in particular between 100° C. and 300° C., preferably between 120° C. and 240° C., wherein in particular the laminating speed lies between 0.125 m/min and 10 m/min, preferably between 0.25 m/min and 7.5 m/min, particularly preferably between 0.125 m/min and 5 m/min.

Further preferably, FIG. 2 shows the multilayer body 1 after the thermoforming of the series of layers 4 comprising the substrate 2 and the sensor film 3 applied to the second surface 2*b* of the substrate 2 shown in FIG. 1, wherein, during the thermoforming, on the first surface 2*a* of the substrate 2 a surface relief 5 is formed which is determined by the shaping 6 of the sensor film 3.

It has proved to be advantageous in particular that, during the thermoforming of the series of layers 4, the surface relief 5 is formed by means of deep-drawing and heating of the substrate 2, wherein the substrate is preferably heated to a surface temperature between 80° C. and 300° C., in particular between 90° C. and 250° C., preferably between 100° C. and 300° C., wherein in particular the core temperature of the substrate lies between 120° C. and 160° C., preferably between 100° C. and 180° C., particularly preferably between 80° C. and 200° C., and/or wherein a pressure, in particular a positive pressure between 1 bar and 6 bar, in particular between 2 bar and 5 bar, preferably between 2 bar and 3.5 bar, is applied. This pressure acts on the substrate in particular from one of the two sides. A vacuum, thus a negative pressure, which is preferably between 0.1 bar and 0.9 bar, in particular between 0.2 bar and 0.8 bar, is preferably additionally applied supportively from the corresponding other side of the substrate. For example, a positive pressure can act from the front side of the substrate and a negative pressure can act from the rear side of the substrate, or vice versa; this preferably means that a negative pressure is applied from the front side of the substrate and a positive pressure is applied from the rear side of the substrate.

It is preferably also possible, during the thermoforming of the series of layers 4, for the surface relief 5 to be formed by means of lamination of the series of layers 4, wherein the laminating temperature preferably lies between 80° C. and 300° C., in particular between 100° C. and 260° C., preferably between 120° C. and 240° C., wherein in particular the laminating speed lies between 0.125 m/min and 10 m/min, preferably between 0.25 m/min and 10 m/min, particularly preferably between 0.5 m/min and 10 m/min, and/or preferably between 0.25 m/min and 7.5 m/min.

It is also possible for the multilayer body 1 to comprise a single-layered or multi-layered substrate 2 with a first surface 2*a* and a second surface 2*b* and one or more sensor films 3 which each comprise at least one sensor area and have a first surface 3*a* and a second surface 3*b* facing away from the first surface 3*a*, wherein the one or more sensor films 3 are arranged on the second surface 2*b* of the substrate 2, wherein the first surface 3*a* of the sensor film 3 rests on the second surface 2*b* of the substrate 2, and wherein on the first surface 2*a* of the substrate 2 a surface relief 5 is formed which is determined by the shaping 6, in particular contour and/or relief, of one or more of the one or more sensor films 3.

A substrate 2 is preferably provided as substrate 2 and/or a sensor film 3 is preferably provided as sensor film 3, which comprise one or more decorative layers, wherein in particular the decorative layers have one or more pictograms in one or more areas, preferably in the sensor area, wherein one or more pictograms of the one or more pictograms overlap or supplement each other to form an overall pictogram.

Figure 3:
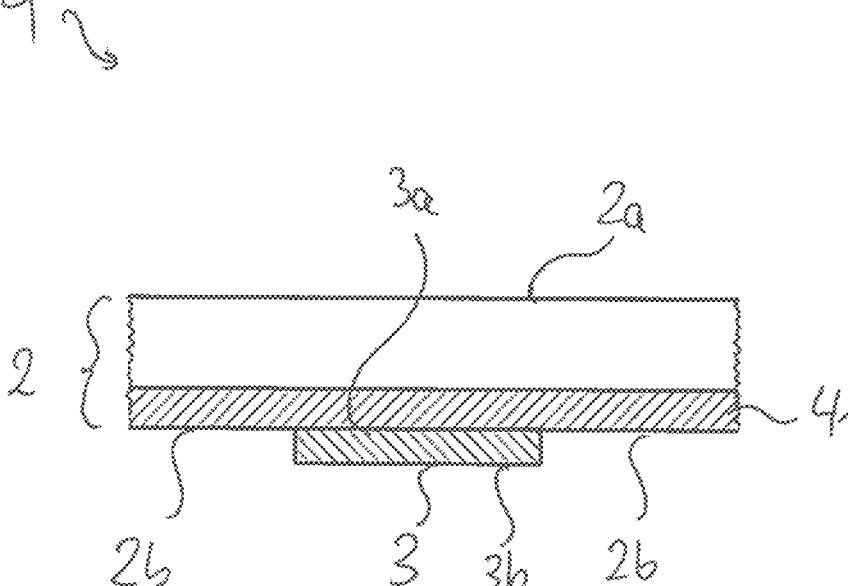
FIG. 3 shows a schematic representation of a series of layers

FIG. 3 shows a series of layers 4 comprising a sensor film 3 and a substrate 2 in cross section, wherein the substrate 2 has a decorative layer 41. Here, the decorative layer 41 is preferably applied to the surface of the substrate 2 facing the sensor film 3 or to the substrate 2 from sides of the second surface 2*b* of the substrate 2. The first surface 3*a* sensor film 3 rests on the second surface 2*b* of the substrate 2, in particular in areas.

In particular, the decorative layer 41 has a layer thickness between 0.01 mm and 10 mm, in particular between 0.1 mm and 2.5 mm, preferably between 0.25 mm and 1.25 mm, and/or between 0.1 mm and 10 mm, in particular between 0.25 mm and 2.5 mm, preferably between 0.25 mm and 1.25 mm.

It is possible for the sensor film 3 to be applied to the second surface of the substrate 2 comprising the decorative layer 41 in particular by means of a stamping method, roll-on method and/or back injection molding method.

It is also possible for a substrate 2 preferably to be provided as substrate 2, which comprises one or more layers selected from: layers comprising pigments, color layers, metal layers, metallized layers, in particular partially metallized layers, transparent layers, translucent layers, opaque layers.

Figure 4:
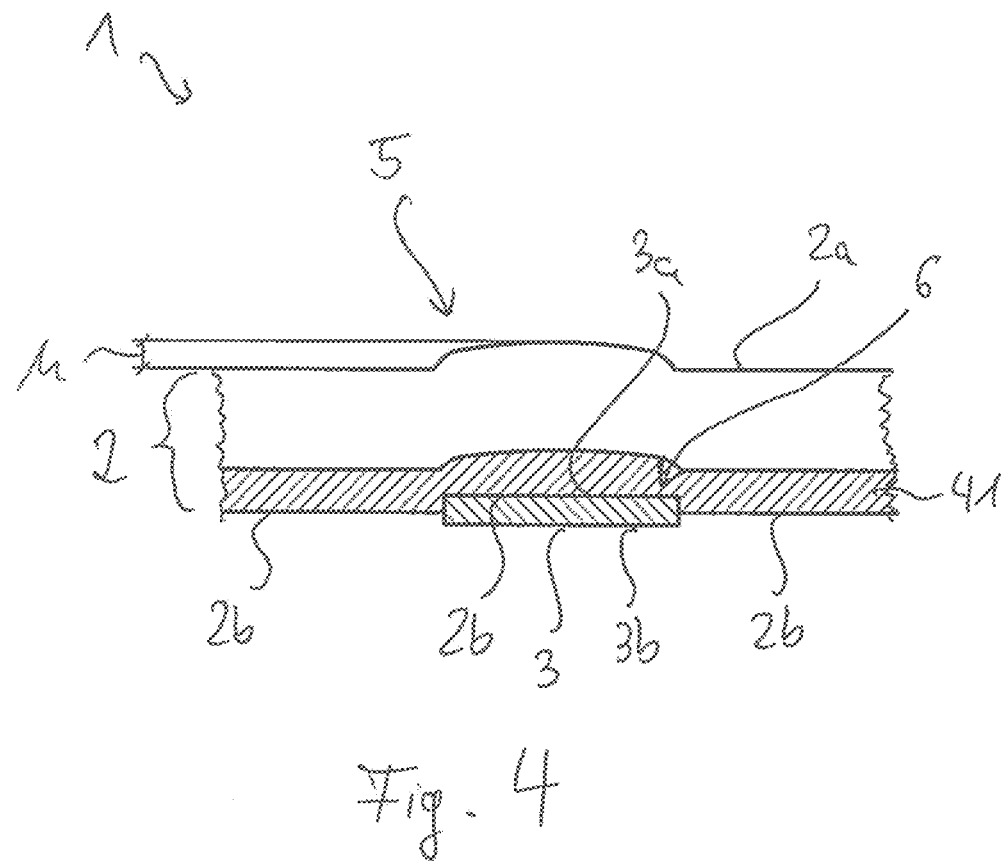
FIG. 4 shows a schematic representation of a multilayer body

FIG. 4 shows a multilayer body 1 comprising a substrate 2 in cross section, wherein the substrate 2 has a decorative layer 41, which is applied to the surface of the substrate 2 facing the sensor film 3, and a sensor film 3, wherein the first surface 2*a* of the substrate 2 forms a surface relief 5. Here, the surface relief 5 is determined by the shaping 6 of the sensor film 3.

The shape the shaping 6 of the at least one sensor film 3 is preferably modified during the provision of the sensor film 3.

FIG. 3 further preferably shows here the series of layers 4 which results from applying the sensor film 3 to the second surface 2*b* of the substrate 2, wherein the first surface 3*a* of the sensor film 3 rests on the second surface 2*b* of the substrate 2 at least in areas.

FIG. 4 in particular preferably shows the multilayer body 1 after the thermoforming of the series of layers 4 comprising the substrate 2 and the sensor film 3 applied to the second surface 2*b* of the substrate 2 shown in FIG. 3, wherein, during the thermoforming, on the first surface 2*a* of the substrate 2 a surface relief 5 is formed which is determined by the shaping 6 of the sensor film 3.

Here, the surface relief 5 formed during the thermoforming on the first surface 2*a* of the substrate 2 has a height difference h relative to the original plane of the first surface 2*a* of the substrate 2 in the series of layers 4 shown in FIG. 3. The height difference shown in FIG. 4 is in particular the difference between the absolute maximum of the surface relief 5 and the absolute minimum of the surface relief 5 along a direction which runs in particular parallel to the surface normal defined by the plane of the multilayer body 1 shown in FIG. 4. The absolute minimum of the surface relief 5 preferably corresponds to the plane spanned by the second surface 2*a* of the substrate 2 outside of the surface relief 5.

In particular, tests have shown that the surface relief 5 formed on the first surface 2*a* of the substrate 2 preferably has a maximum height difference and/or an average height difference between a local minimum of the surface relief 5 or an overall minimum of the surface relief 5 and a local maximum of the surface relief 5 or an overall maximum of the surface relief 5 which is less than 5000 μm, in particular less than 2000 μm, preferably less than 1000 μm.

It is further possible for the surface relief 5 formed on the first surface 2a of the substrate 2 preferably to have a maximum height difference and/or an average height difference between a local minimum of the surface relief 5 or an overall minimum of the surface relief 5 and a local maximum of the surface relief 5 or an overall maximum of the surface relief 5 which is greater than or equal to 50 μm, in particular greater than 25 μm, preferably greater than 10 μm.

Figure 5:
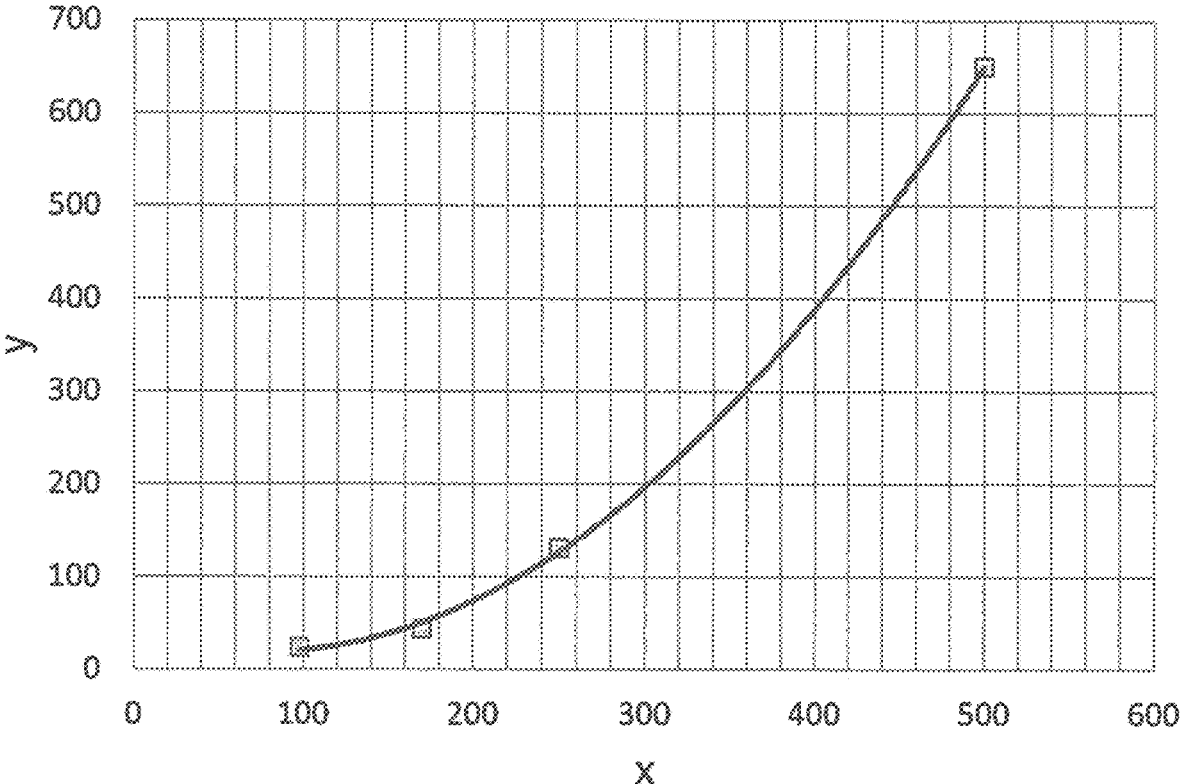
FIG. 5 shows a schematic representation of a graph

FIG. 5 and Table 1 show the results a series of a series of measurements in dependence on the variables x and y, wherein the series of measurements comprises four measurement points (identified by squares). The variable x corresponds to the layer thickness of the sensor film 3 applied to the substrate 2 and the variable y corresponds to the layer thickness of the substrate 2 after the thermoforming. The substrate 2 had in particular a layer thickness of $y_0 = 750$ μm before the thermoforming.

TABLE 1

| Substrate layer thickness before the thermoforming $y_0$ [μm] | Sensor film layer thickness x [μm] | Height h (in particular h shown in FIG. 4) $y_1$ [μm] |
|---|---|---|
| 750 | 98 | 122 |
| 750 | 170 | 214 |
| 750 | 250 | 381 |
| 750 | 500 | 1150 |

It has been shown here in particular that the change in the height of the provided substrate with sensor laminated on, preferably of a substrate with sensor with a predetermined layer thickness laminated on, due to the thermoforming has in particular a functional relationship with the layer thickness of the applied sensor film, wherein this functional relationship is in particular a quadratic polynomial of the form $y = a \cdot x^2 + b \cdot x + c$, preferably with the parameters a=0.0035; b=0.4832, c=38.19; and preferably the variables x=layer thickness of the applied sensor label, y=height h of the shaping at the location of the sensor label compared with the remaining substrate surface area without sensor label after the thermoforming.

Figure 6:
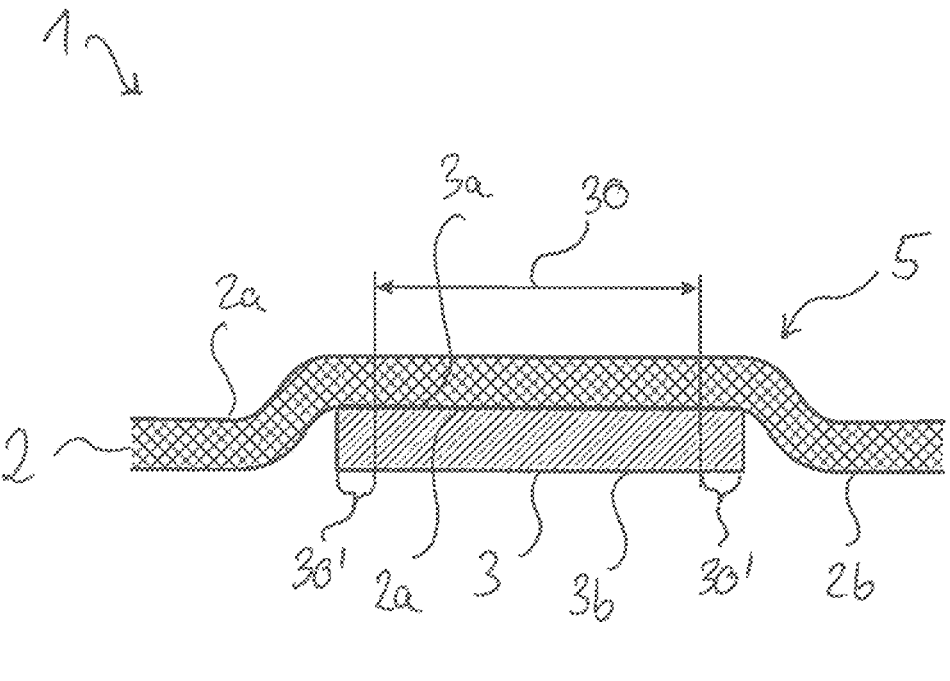
FIG. 6 shows a schematic representation of a multilayer body

FIG. 6 shows a multilayer body 1 comprising a sensor film 3 and a substrate 2 in cross section, wherein the sensor film 3 is applied to the second surface 2b of the substrate 2 in areas. A surface relief 5 is further formed in the first surface 2a of the substrate 2. The multilayer body 1 and in particular the sensor film 3 further have a sensor area 30 which is in particular surrounded by a closed edge area or two non-contiguous edge areas 30'. The edge area 30' is preferably arranged annularly, in particular annularly, around the sensor area 30, wherein the sensor area 30 is in particular formed in the shape of the area of a circle.

In particular, the sensor film 3 in the sensor area 30 has one or more sensor elements, in particular capacitive and/or resistive sensor elements. Further preferably, the sensor film 3 has a connection area and/or contact area for the contacting, in particular for the electrical contacting, of one or more of the sensor elements.

A sensor film 3 which has a base film and one or more electrically conductive layers, in particular consisting of a metallic material, applied to and/or introduced into the base film is preferably provided as sensor film 3.

It is possible for the one or more electrically conductive layers in the sensor area 30 to form one or more sensor electrodes for the formation of one or more of the sensor elements, in particular to form for the formation of one or more capacitive sensor elements and/or one or more resistive sensor elements, and/or for the one or more electrically conductive layers to have one or more contact electrodes for the contacting of the one or more sensor electrodes in the connection area and/or contact area.

It is further possible for the sensor area 30 to comprise at least one at least partially encircling edge area, in particular a ring-shaped edge area, in particular a circular ring-shaped edge area, in which the one or more sensor electrodes are not present, wherein the edge area preferably encircles the circumference of the sensor area 30 from the outside or from the inside and/or follows the circumference of the sensor area 30 and/or completely or partially overlaps the circumference of the sensor area 30, wherein the edge area preferably has a width, in particular a radial width, between 0.25 mm and 5 mm, preferably between 0.5 mm and 5 mm, and/or for the ring-shaped edge area, in particular the circular ring-shaped edge area, preferably to have a ring width between 0.25 mm and 5 mm, preferably between 0.5 mm and 2 mm.

Figure 7:
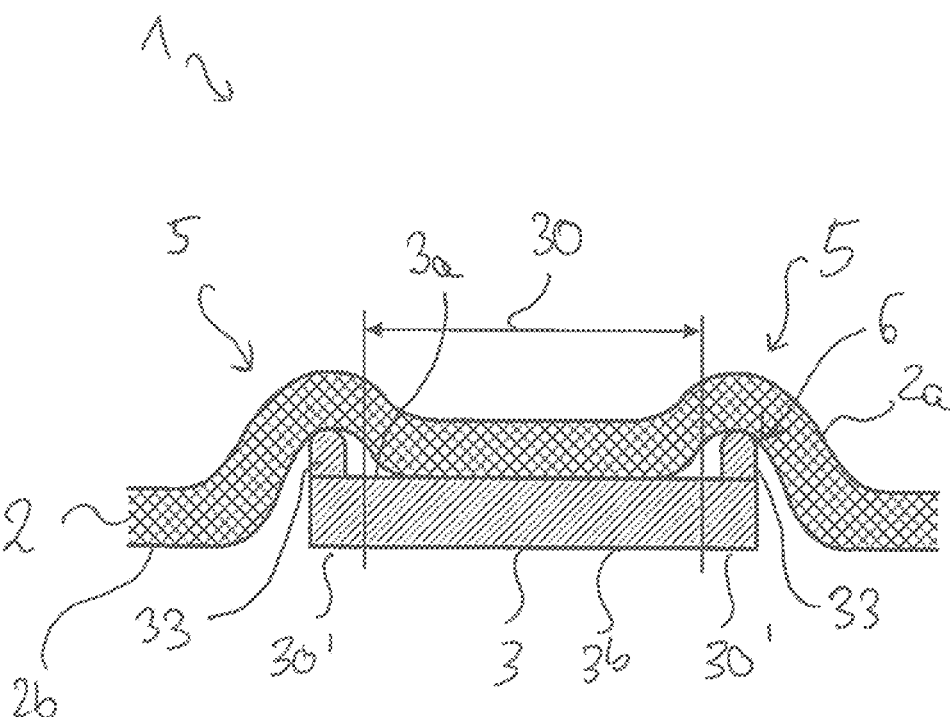
FIG. 7 shows a schematic representation of a multilayer body

FIG. 7 shows the multilayer body shown in FIG. 6 in cross section, except for the fact that the present multilayer body 1 has functional elements 33, which are arranged in particular between the second surface 2 of the substrate 2 and the first surface 3a of the sensor film 3, in the edge areas 30'. In the first surface 2a of the substrate 2 a surface relief 5 is formed which follows the shaping 6. The shaping 6 here is provided in particular by the sensor film 3 and the functional elements 33.

In particular, it is possible for the shaping 6, in particular the contour and/or the relief, of the sensor film 3 to be modified by molding of at least one surface relief, wherein the at least one surface relief is molded into one or more layers of the sensor film in particular by means of one or more methods selected from: thermal replication, UV replication, laser ablation, punching, cutting, stamping, injection molding. Here, the surface relief we preferably introduced into the first surface 3a and/or the second surface 3b of the sensor film 3.

It is further possible for the shaping, in particular the relief and/or the contour, of the sensor film 3 to be modified by applying one or more elements, in particular by applying the functional elements 33, to the base film of the sensor film 3, which elements are in particular applied by means of one or more of the following methods: printing, in particular printing on a varnish, and/or by means of 3D printing, laminating on a one or multi-layered film element, in particular a plastic label, applying a woven fabric, in particular a glass fiber fabric, applying a fiber material, in particular an organic fiber material, back injection molding, applying the one or more elements by means of a transfer method, in particular a hot- or cold-stamping method.

It is possible for the functional elements 33 to be applied in particular to a first surface of a base film of the sensor film 3, wherein the first surface of the base film is preferably facing the first surface 3a of the sensor film 3 and/or partially forms the first surface 3a of the sensor film.

It is further possible for the functional elements 33 to be applied to one or more of the functional elements 33 applied to the first surface of the base film of the sensor film 3.

It is also possible for the functional elements 33 to be applied to the base film in the sensor area 30 of the sensor film 3 and to completely or partially overlap the sensor area 30, in particular projected onto the plane, in particular flat or curved plane, spanned by the first surface 3a of the at least one sensor film 3.

Figure 8:
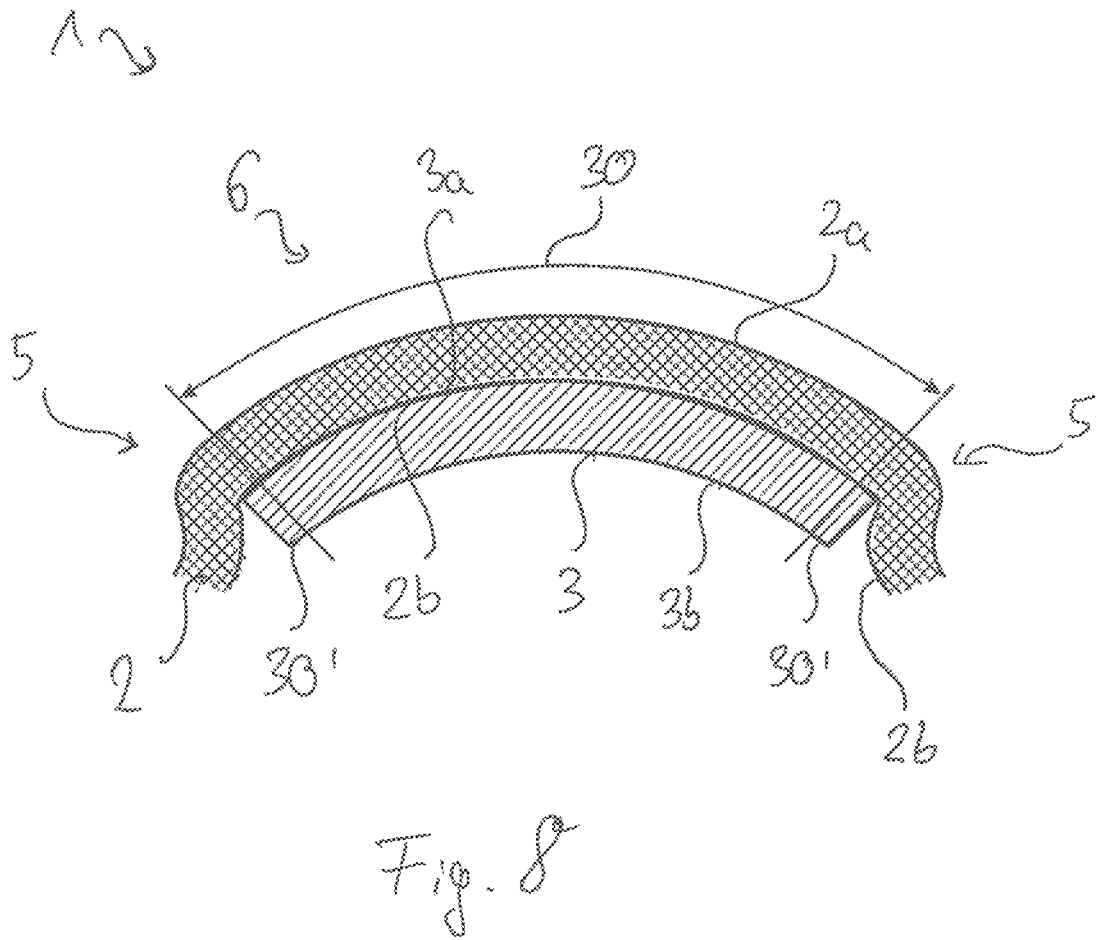
FIG. 8 shows a schematic representation of a multilayer body

FIG. 8 shows the multilayer body shown in FIG. 6 in cross section, except for the fact that the present multilayer body 1 has a curvature. The surface relief 5 formed in the first surface 2a of the substrate 2 further has a curvature, which in particular follows the curvature of the multilayer body 1.

It is possible for the series of layers 4 forming the basis of the multilayer body 1, before the thermoforming, preferably to have a curvature with a minimum or maximum radius of curvature and/or with an average radius of curvature of no smaller than 1.5 mm, preferably of no smaller than 1 mm.

It is further possible for the series of layers 4 forming the basis of the multilayer body 1 to be modified during the thermoforming in such a way that, after the thermoforming, the series of layers 4 or the multilayer body 1 has a curvature with a minimum or maximum radius of curvature and/or with an average radius of curvature of no smaller than 1.5 mm, preferably of no smaller than 1.0 mm.

The series of layers 4 and/or the multilayer body 1 preferably have different or identical curvatures in different directions.

Figure 9:
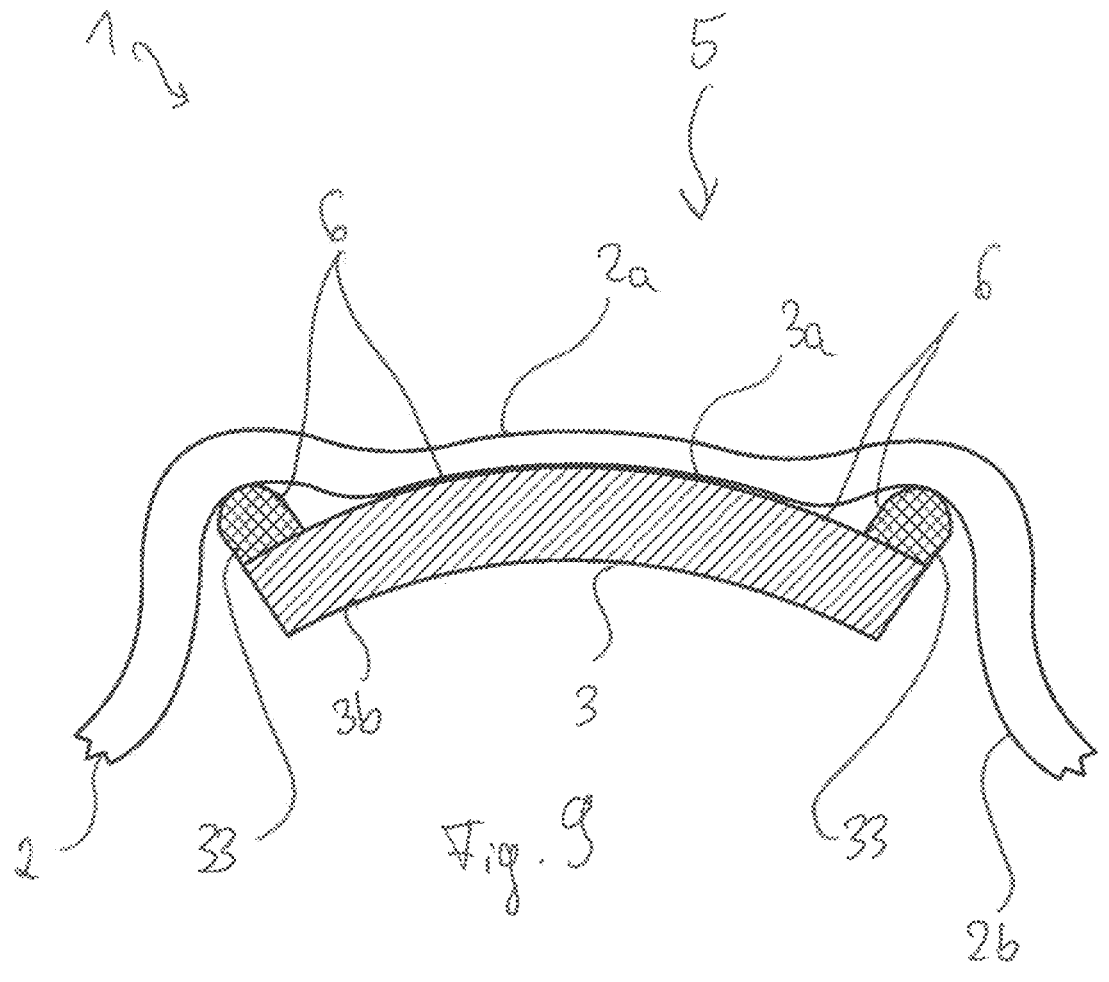
FIG. 9 shows a schematic representation of a multilayer body

FIG. 9 shows the multilayer body comprising the elements 33 shown in FIG. 7 in cross section, except for the fact that the present multilayer body 1 has a curvature. The surface relief 5 formed in the first surface 2a of the substrate 2 further has a curvature which in particular follows the curvature of the multilayer body 1 and the shaping 6 determined by the sensor film 3 and the functional elements 33.

Figure 10:
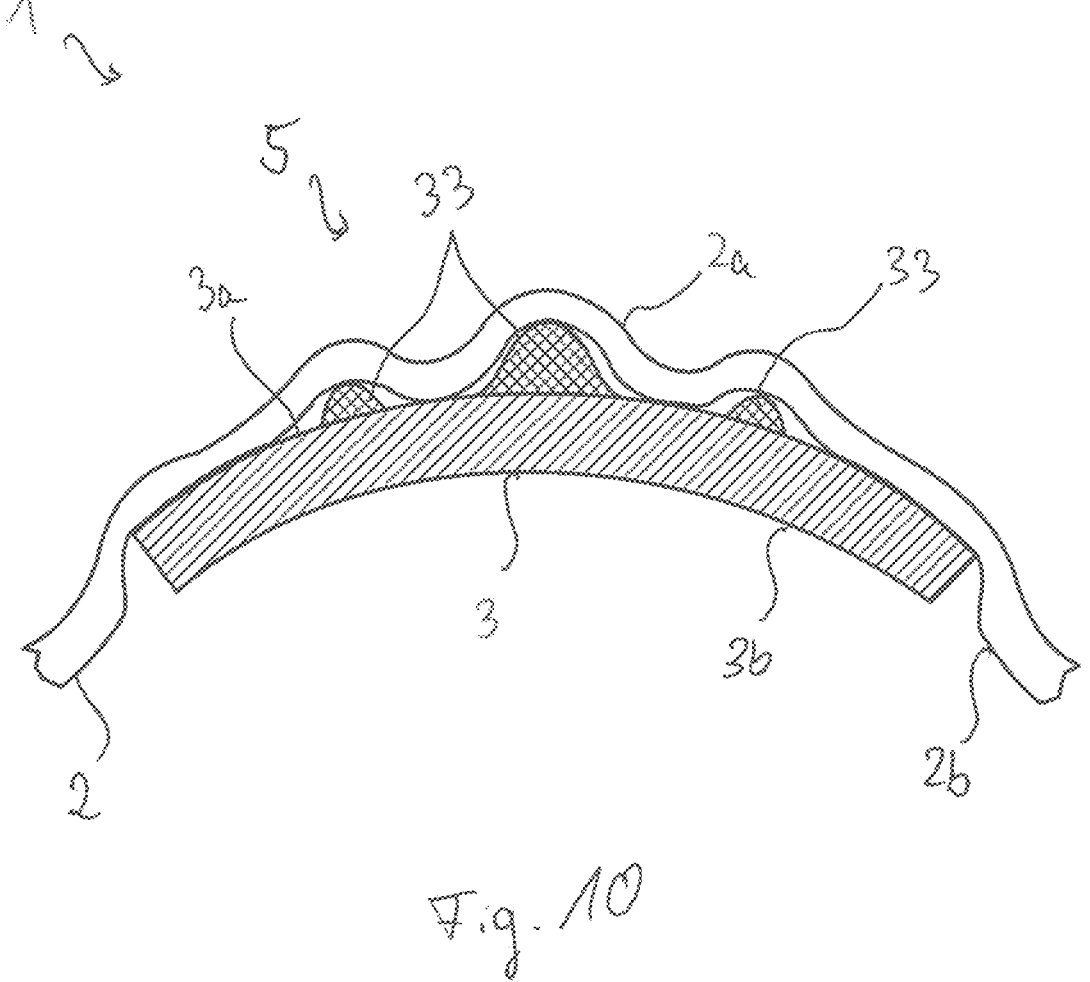
FIG. 10 shows a schematic representation of a multilayer body

FIG. 10 shows the curved multilayer body shown in FIG. 9 in cross section, except for the fact that the present multilayer body 1 does not have any functional elements 33 at the edges of the sensor film 3, but rather at different distances from the edges of the sensor film 3. The surface relief 5 formed in the first surface 2a of the substrate 2 further has a curvature which in particular follows the curvature of the multilayer body 1 and the shaping 6 determined by the sensor film 3 and the functional elements 33.

Figure 11:
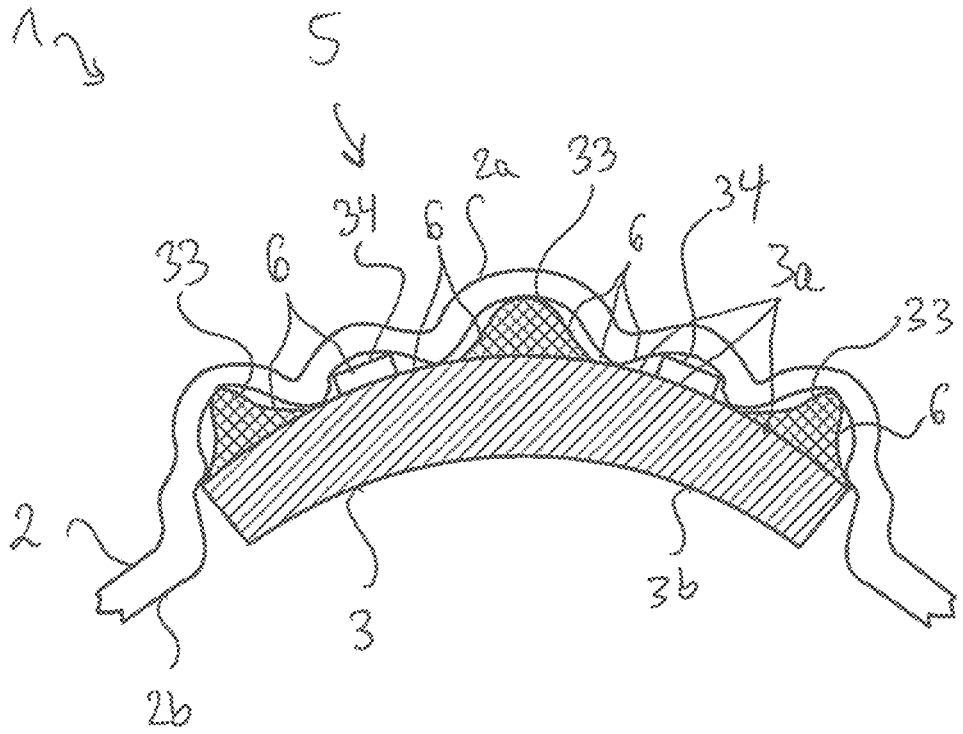
FIG. 11 shows a schematic representation of a multilayer body

FIG. 11 shows the curved multilayer body shown in FIG. 10 in cross section, except for the fact that the present multilayer body 1 has functional elements 33 at the edges of the sensor film 3, has functional elements 33 at different distances from the edges of the sensor film 3 and has light guides 34 which are arranged in particular between the functional elements 33 on the first surface 3a of the sensor film 3. The surface relief 5 formed in the first surface 2a of the substrate 2 further has a curvature which in particular follows the curvature of the multilayer body 1 and the shaping 6 determined by the sensor film 3, the functional elements 33 and the light guides 34.

One or more of the functional elements 33 are preferably formed by one element which performs an electrical and/or optical function, is in particular constituted by a light guide.

Figure 12:
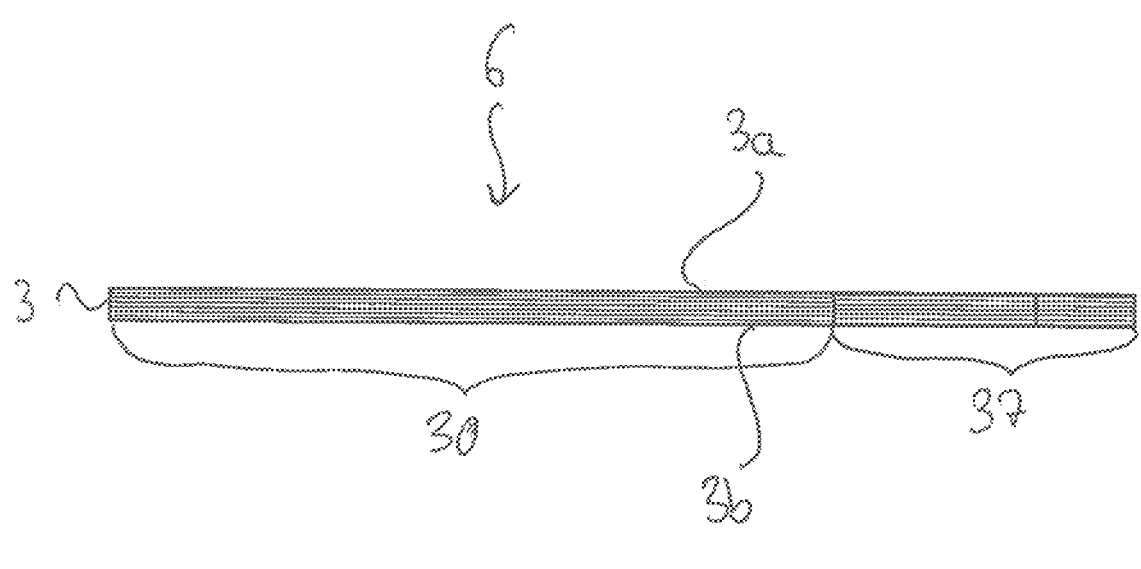
FIG. 12 shows a schematic representation of a sensor film

FIG. 12 shows a sensor film 3 comprising a sensor area 30 and a connection area which preferably ends in a contact area 37 as well as a first surface 3a and a second surface 3b in cross section. The sensor film 3 further has a flat or level shaping 6. The sensor film 3 preferably comprises a base film.

It is possible for the sensor film 3 to have the contact area 37 in particular for the contacting, in particular for the electrical contacting, of one or more sensor elements arranged in the sensor area 30.

Figure 13:
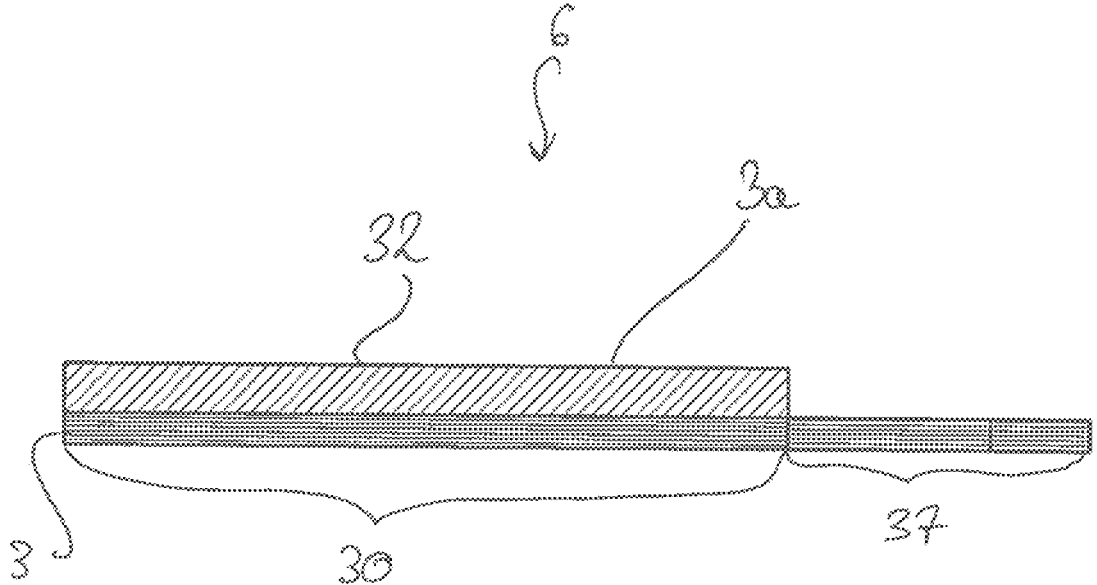
FIG. 13 shows a schematic representation of a sensor film

FIG. 13 shows the sensor film shown in FIG. 12 in cross section, except for the fact that the present sensor film 3 has a plastic label 32 resting on the first surface 3a of the sensor film 3 in the sensor area 30.

Figure 14:
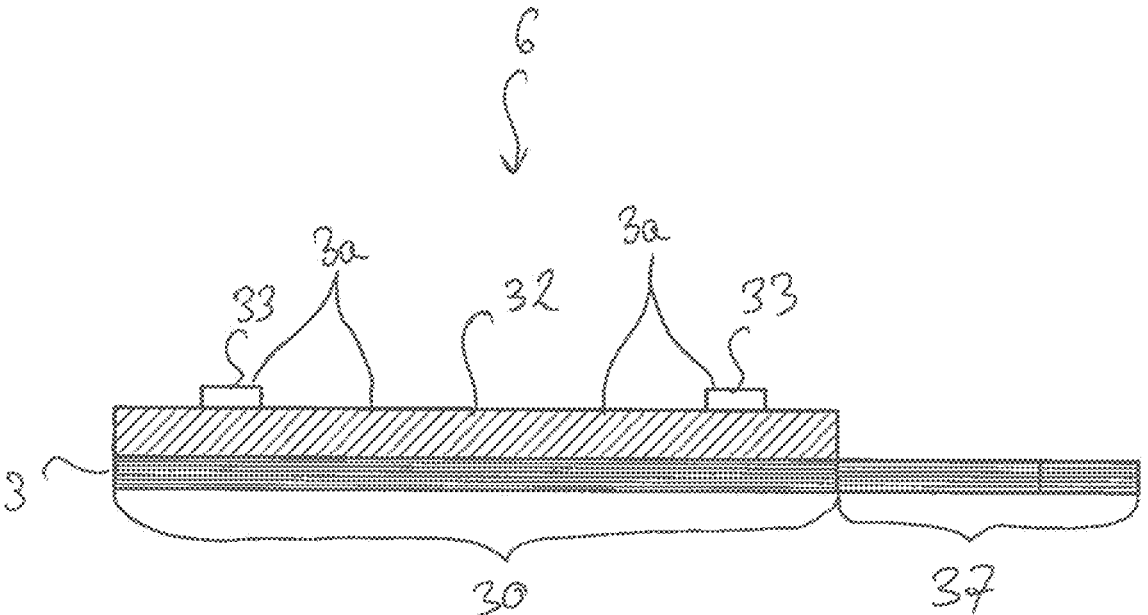
FIG. 14 shows a schematic representation of a sensor film

FIG. 14 shows the sensor film comprising the plastic label 32 shown in FIG. 13 in cross section, except for the fact that the present sensor film 3 has functional elements 33 applied to the surface of the plastic label 32 facing away from the sensor film 3 in the sensor area 30.

In particular, the plastic labels 32 is applied as an element and/or the functional elements 33 are applied as elements to the first surface of the base film of the sensor film 3, wherein the first surface of the base film is facing the first surface 3a of the sensor film 3 and/or partially forms the first surface 3a of the sensor film 3.

One or more plastic labels 32 and/or one or more functional elements 33 are preferably applied to the plastic label 32 applied to the first surface of the base film of the sensor film 3 and/or to the functional elements 33 applied to the first surface of the base film of the sensor film.

It is possible for the plastic label 32 and/or the functional elements 33 to be applied in particular to the base film in the sensor area 30 of the sensor film 3 and to completely or partially overlap the sensor area 30, in particular projected onto the plane, in particular flat or curved plane, spanned by the first surface 3a of the at least one sensor film 3.

It is further possible for the sensor film 3 to have the contact area 37 in particular for the contacting of one or more sensor elements arranged in the sensor area 30 and for the plastic label 32 and/or the functional elements 33 to be applied to the base film in the sensor area 30 of the sensor film 3 and preferably to completely or partially overlap the sensor area 30, in particular projected onto the plane, in particular flat or curved plane, spanned by the first surface 3a of the at least one sensor film 3, but not to overlap the contact area 37 of the sensor film 3.

Figure 15:
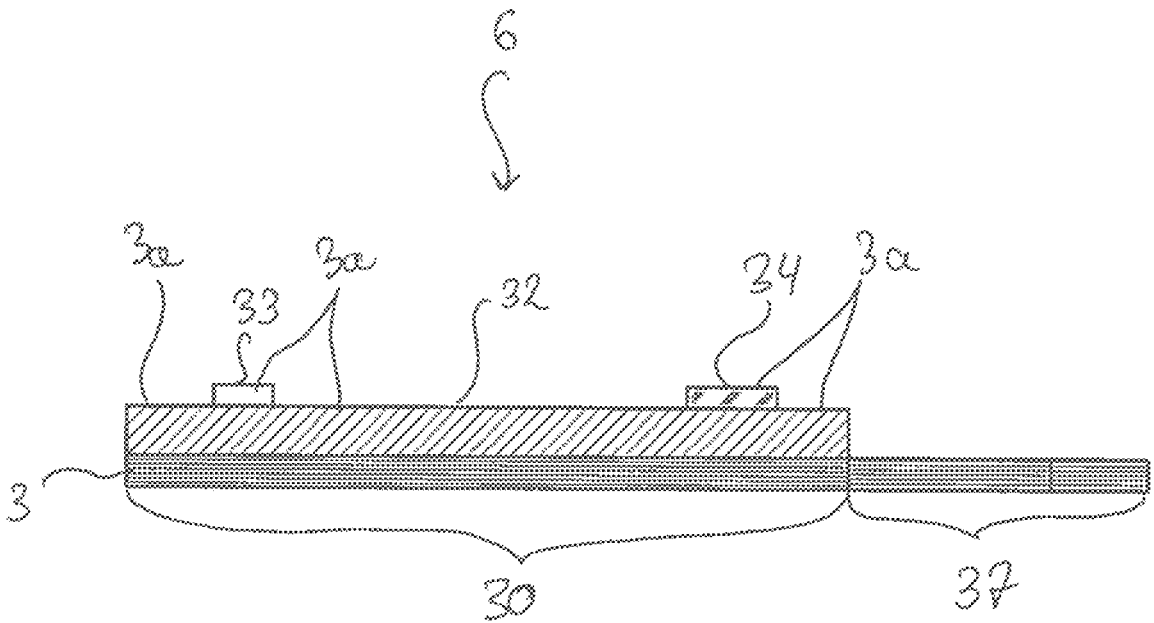
FIG. 15 shows a schematic representation of a sensor film

FIG. 15 shows the sensor film comprising the plastic label 32 and the functional elements 33 shown in FIG. 14 in cross section, except for the fact that the present sensor film 3 has a functional element 33, applied to the surface of the plastic label 32 facing away from the sensor film 3 in the sensor area 30, and a light guide 34.

Figure 16:
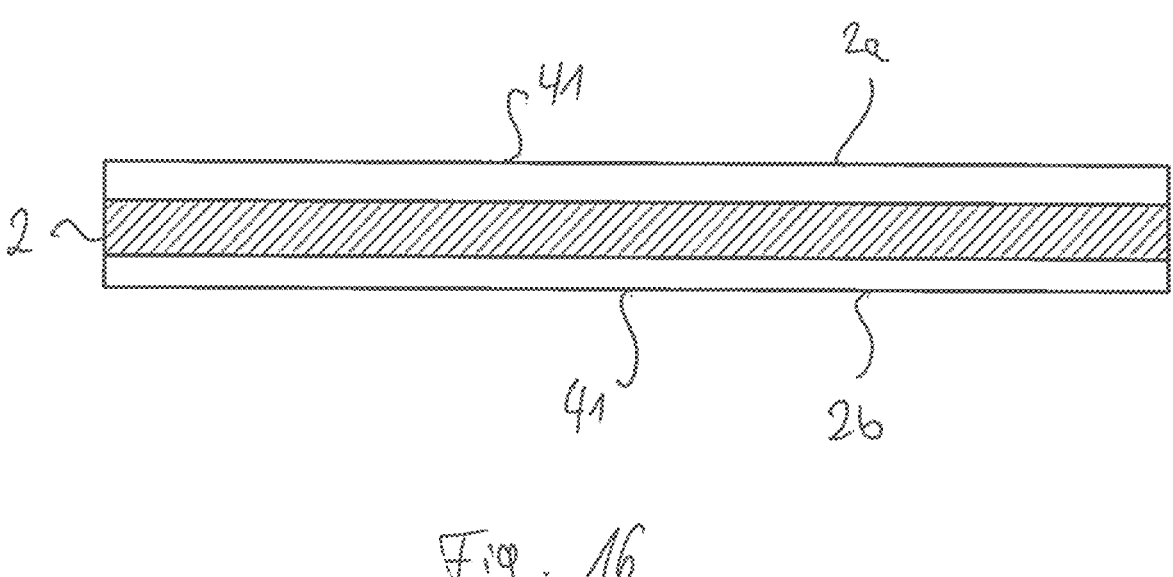
FIG. 16 shows a schematic representation of a substrate

FIG. 16 shows a substrate 2 comprising two decorative layers 41 in cross section, wherein the two decorative layers 41 are in particular in each case applied to the substrate 2 from sides of the first surface 2a of the substrate 2 and applied to the substrate 2 from sides of the second surface 2b of the substrate 2.

Figure 17:
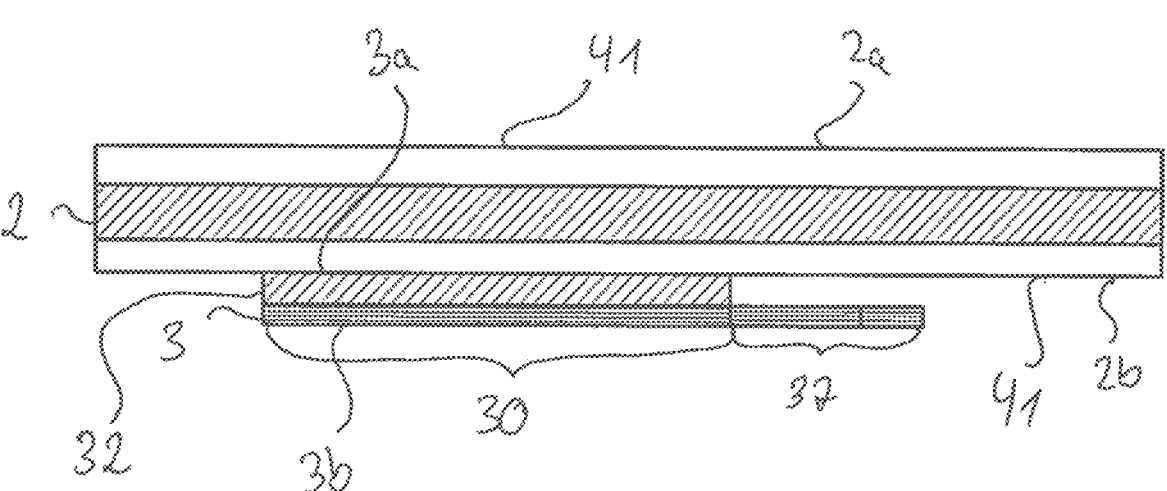
FIG. 17 shows a schematic representation of a series of layers

FIG. 17 shows the substrate 2 comprising two decorative layers 41 shown in FIG. 16 and the sensor film 3 comprising a plastic label 32 shown in FIG. 13 as a series of layers 4 in cross section, wherein the side of the plastic label 32 facing away from the sensor film 3 rests on the second surface 2b of the substrate 2 in areas.

Figure 18:
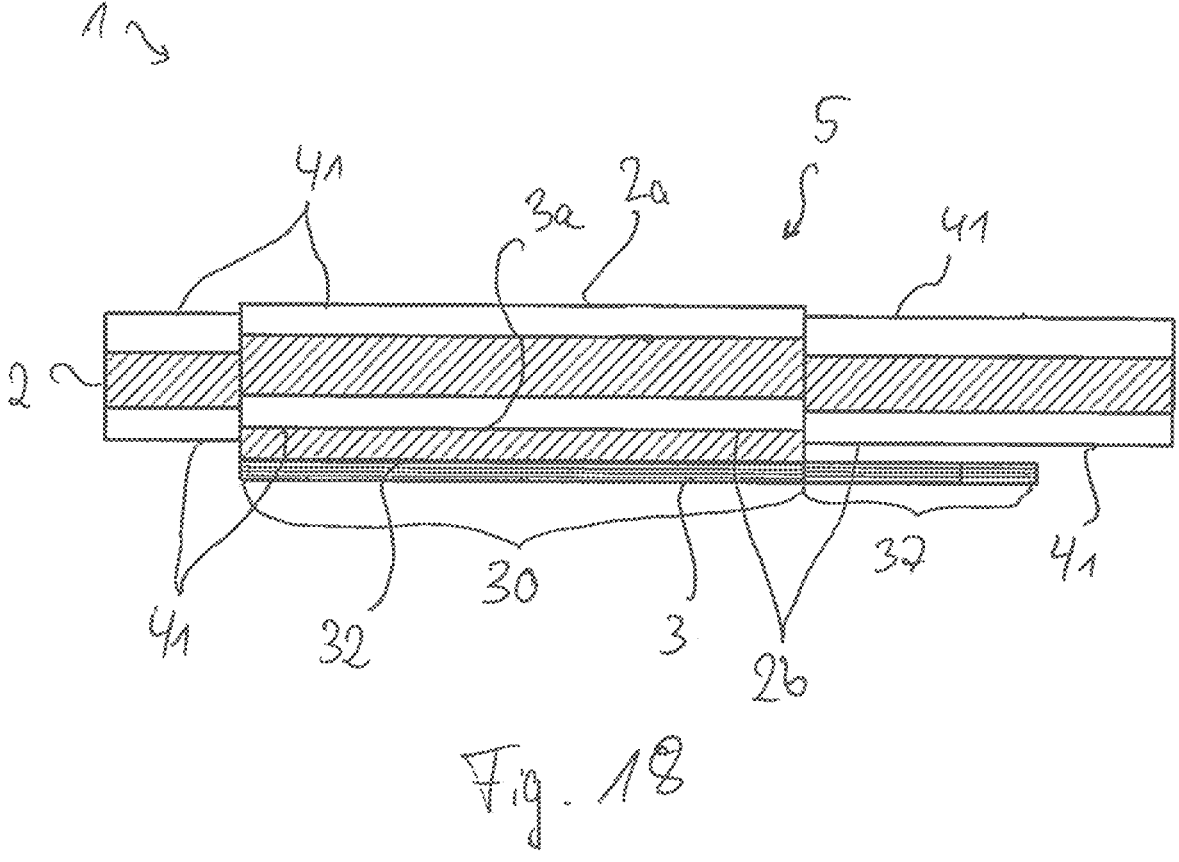
FIG. 18 shows a schematic representation of a multilayer body

FIG. 18 shows the series of layers 4 shown in FIG. 17, after the thermoforming, as a multilayer body 1 in cross section, wherein in the first surface 2a of the substrate 2 of the multilayer body 1 a surface relief 5 is molded which is determined in particular by the shaping 6 of the surface of the plastic label 32 facing away from the sensor film 3.

Figure 19:
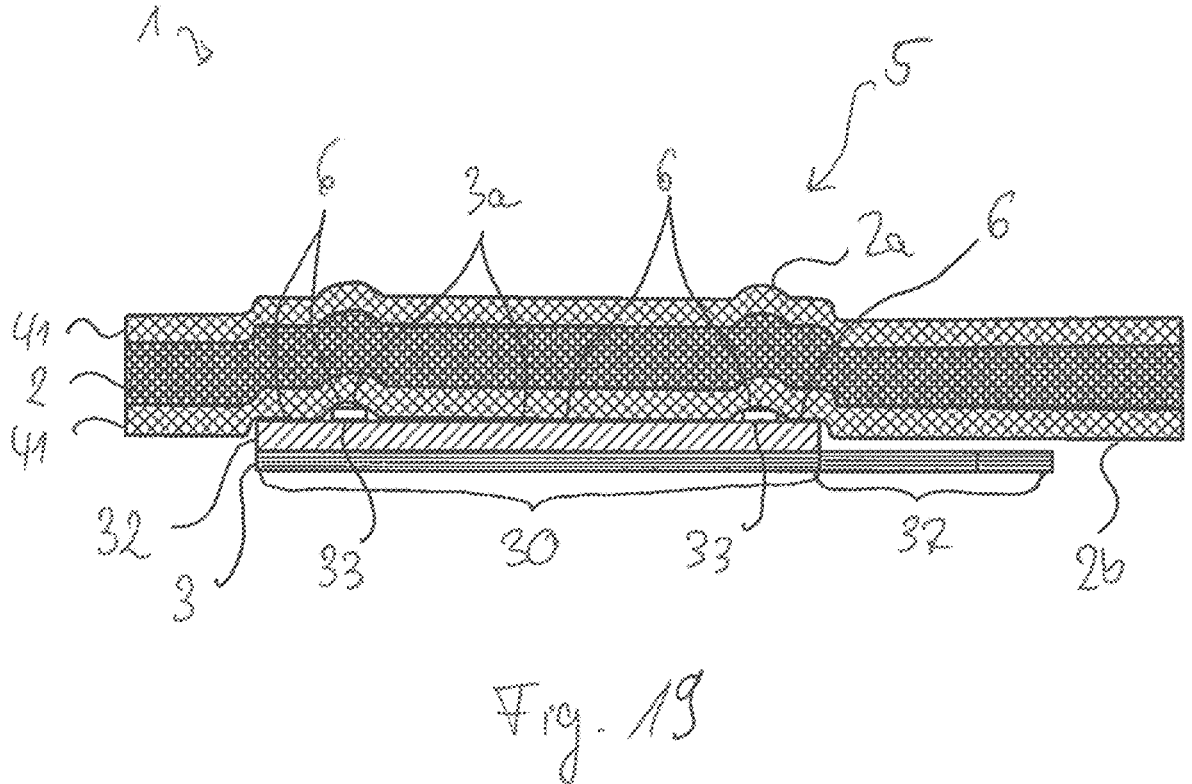
FIG. 19 shows a schematic representation of a multilayer body

FIG. 19 shows the substrate 2 comprising two decorative layers 41 shown in FIG. 14 and the sensor film 3 comprising a plastic label 32 and the functional elements 33 shown in FIG. 14 as a multilayer body 1, after the thermoforming, in cross section, wherein the side of the plastic label 32 facing away from the sensor film 3 rests on the second surface 2b of the substrate 2 in areas. The surface relief 5 in the first surface 2a of the substrate 2 of the multilayer body 1 further follows in particular the shaping 6 determined by the sensor film 3, the plastic label 32 and the functional elements 33.

Figure 20:
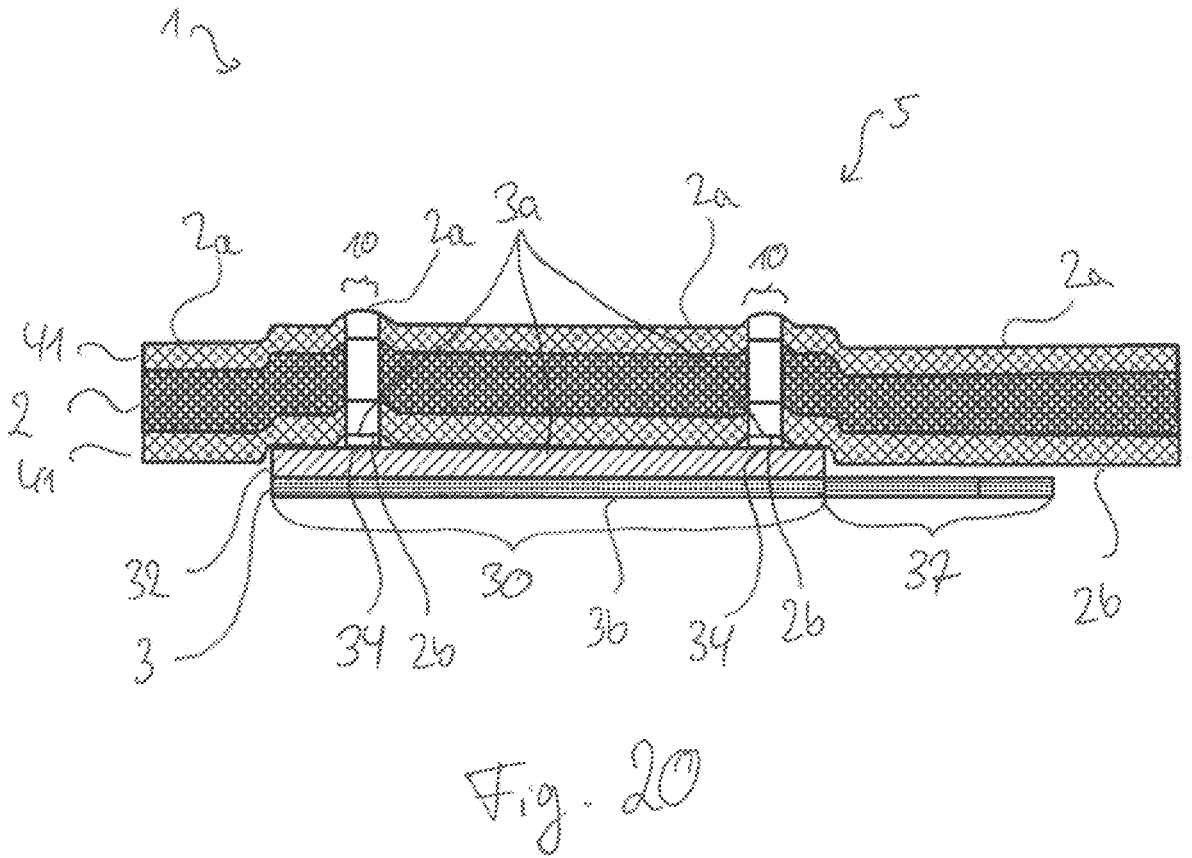
FIG. 20 shows a schematic representation of a multilayer body

FIG. 20 shows the multilayer body shown in FIG. 19 in cross section, except for the fact that the present multilayer body 1 or the substrate 2 comprising the two decorative layers 41 has two transparent areas 10. The functional elements are preferably formed as light guides 34 here. Observed from the first surface 2a of the substrate 2, the emitted light of the light guides 43 is preferably detectable by an observer through the transparent areas 10 of the substrate 2 comprising the two decorative layers 41. The transparent areas 10 are preferably integrated into the surface relief 5 in such a way that the light guides 34 are detectable in particular from sides of the first surface 2a of the substrate 2 of the multilayer body 1.

It is possible for the substrate 2 to have one or more transparent areas or the transparent areas 10, wherein in particular the transmittance of the substrate 2 between the first surface 2a of the substrate 2 and the second surface 2b of the substrate 2 in the one or more transparent areas or the transparent areas 10 in a wavelength range visible to the human eye is greater than 1%, preferably greater than 2%, further preferably greater than 4%, and/or less than 99%, preferably less than 95%, further preferably less than 92%.

Further, it is also possible for the one or more sensor electrodes, in particular one or more active sensor areas of the one or more sensor electrodes, which are in particular arranged in the sensor film 3, to have a transparency to the human eye with a transmittance of more than 60%, in particular of more than 80%, and/or in each case to be constituted by a network of thin strip conductors with a strip conductor width between 3 µm and 60 µm, in particular 4 µm and 60 µm, in particular preferably between 4 µm and 50 µm.

It has proved to be advantageous for the touch functionality of the multilayer body 1 that the series of layers 4 forming the basis of the multilayer body has, at least in the sensor area 30, a capacitance of at most 200 pF, preferably at most 150 pF, further preferably at most 100 pF.

It is further advantageous that the surface relief 5 formed on the first surface 2a of the substrate 2 is preferably haptically and/or optically detectable and/or that the surface relief 5 formed on the first surface 2a of the substrate 2 is in particular haptically but not optically detectable or is optically but not haptically detectable or is haptically and not optically detectable or is optically and not haptically detectable.

The surface relief 5 formed on the first surface of the substrate 2 is preferably formed as Braille, in particular as one or more letters, one or more numbers, one or more words, and/or one or more sentences in Braille.

It is further possible for the sensor film 3 in the sensor area 30 to have, in particular in areas or over the whole surface, one or more films and/or one or more layers selected from: base film, plastic label 32, functional elements 33, in particular light guide 34, decorative layer 41, electrically conductive layer, in particular metallic layer, adhesive layer, adhesion-promoter layer, wherein the one or more electrically conductive layers in each case have one or more sensor electrodes and/or one or more contact electrodes.

It is also possible for the sensor film 3 in the sensor area 30 to have one or more sensor electrodes and/or one or more contact electrodes, wherein the sensor electrodes and/or the contact electrodes, in particular projected onto the plane, in particular flat or curved plane, spanned by the first surface 3a of the at least one sensor film 3, are arranged next to each other and/or do not overlap each other and/or, in particular in the case of observation parallel to a surface normal defined by the plane of the multilayer body, one or more sensor electrodes of the one or more sensor electrodes overlap with one or more contact electrodes of the one or more contact electrodes.

It is further possible for the surface relief 5, in particular projected onto the plane, in particular flat or curved plane, spanned by the first surface 3a of the sensor film 3, to be at least partially composed of one or more straight, curved, circular arc-shaped and/or circular elevations and/or recesses, in particular in the sensor area 30.

Further, it is also possible for the surface relief 5, in particular projected onto the plane, in particular flat or curved plane, spanned by the first surface 3a of the sensor film 3, to be at least partially formed with one or more linear, helical and/or elliptical elevations and/or recesses, in particular in the sensor area 30.

The surface relief 5, in particular in the sensor area 30, is preferably formed in such a way that one or more elevations of the one or more elevations and/or one or more recesses of the one or more recesses, in particular in the sensor area 30, preferably in each case have a constant or varying sidewall angle and/or a constant or varying width and/or a constant or varying height or depths and/or a constant or varying curvature.

In particular, the shape of one or more elevations of the one or more elevations and/or one or more recesses of the one or more recesses, in particular projected onto the plane, in particular flat or curved plane, spanned by first surface 3a of the sensor film 3, is, preferably in the sensor area 30, in each case selected or combined from: line, straight line, motif, image, triangle, wave, quadrilateral, polygon, curved line, circle, oval, trapezoid, parallelogram, rhombus, cross, sickle, branch structure, star, ellipse, random pattern, pseudo-random pattern, wherein the one or more elevations and/or the one or more recesses in particular overlap and/or supplement each other.

It is possible for one or more elevations of the one or more elevations and/or one or more recesses of the one or more recesses to be formed over the progression, in particular in the plane, in particular flat or curved plane, spanned by the first surface 3a of the sensor film 3, of the respective elevations and/or recesses in such a way that one or more of the heights of the elevations and/or one or more depths of the recesses, in particular perpendicular to the plane spanned by the second surface 2b of the substrate 2, do not have a variation or have a variation at least in sections, wherein the variation is selected from: wave-like, symmetrical, asymmetrical, periodic, aperiodic, discrete, continuous, stepped.

LIST OF REFERENCE NUMBERS 1 multilayer body
10 transparent area
2 substrate
2a
3a first surface
3b second surface
2b
3 sensor film
3a first surface
3b second surface
30 sensor area
30' edge area
32 plastic label
33 functional element
34 light guide

US 12,643,278 B2

23

35 sensor element
36 sensor electrodes
36' contact electrodes
37 contact area
4 series of layers
41 decorative layer
42 electrically conductive layers
50a elevation
50b recess
5 surface relief
6 shaping
h height difference
x variable
y variable
The invention claimed is:

1. A multilayer body comprising:
a single-layered or multi-layered substrate with a first surface and a second surface;
one or more sensor films which each comprise at least one sensor area and have a first surface and a second surface facing away from the first surface;
one or more functional elements applied to the first surface of one or more of the one or more sensor films, the one or more functional elements forming a shape on the first surface of the one or more of the one or more sensor films, and the one or more functional elements performing an electrical and/or optical function; and
one or more plastic labels applied as one or more elements to a first surface of a base film of the sensor film, wherein the one or more plastic labels are applied to the base film in the sensor area of the sensor film and completely or partially overlap the sensor area,
wherein the one or more sensor films are arranged on the second surface of the substrate, wherein the first surface of the respective sensor film rests on the second surface of the substrate at least in areas, and wherein on the first surface of the substrate a surface relief is formed which is determined by the shape on the first surface, of the one or more sensor films of the one or more sensor films, and
wherein the one or more sensor films have, in each case in the at least one sensor area, one or more capacitive and/or resistive sensor elements, and the one or more sensor films in each case have at least one connection area and/or contact area for the contacting of one or more of the sensor elements.

2. The multilayer body according to claim 1, wherein one or more sensor films of the one or more sensor films are formed as a transfer film, as a laminating film, as an in-mold film, as a label, as an in-mold label and/or as a sensor label.

3. The multilayer body according to claim 1, wherein the one or more sensor films in the sensor area have, one or more films and/or one or more layers selected from: decorative layer, electrically conductive layer, adhesive layer, adhesion-promoter layer, wherein the one or more electrically conductive layers in each case have one or more sensor electrodes and/or one or more contact electrodes.

4. The multilayer body according to claim 1, wherein the one or more sensor films in the sensor area have one or more sensor electrodes and/or one or more contact electrodes, wherein the sensor electrodes and/or the contact electrodes are arranged next to each other and/or do not overlap each other and/or, in the case of observation parallel to a surface normal defined by the plane of the multilayer body, one or more sensor electrodes of the one or more sensor electrodes overlap with one or more contact electrodes of the one or more contact electrodes.

* * * * *